(12) United States Patent
Zhang et al.

(10) Patent No.: US 12,314,383 B2
(45) Date of Patent: May 27, 2025

(54) PROCESSOR AND ATTACK DETECTION METHOD THEREOF FOR DETECTING JUMP-ORIENTED PROGRAMMING ATTACK

(71) Applicant: ALIBABA (CHINA) CO., LTD., Zhejiang Province (CN)

(72) Inventors: Shijian Zhang, Beijing (CN); Lide Duan, Sunnyvale, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 328 days.

(21) Appl. No.: 18/065,560

(22) Filed: Dec. 13, 2022

(65) Prior Publication Data
US 2024/0037221 A1 Feb. 1, 2024

(30) Foreign Application Priority Data
Jul. 27, 2022 (CN) .......................... 202210889931.6

(51) Int. Cl.
G06F 21/54 (2013.01)
G06F 21/55 (2013.01)
(52) U.S. Cl.
CPC ............ *G06F 21/54* (2013.01); *G06F 21/552* (2013.01); *G06F 21/554* (2013.01)
(58) Field of Classification Search
None
See application file for complete search history.

(56) References Cited

U.S. PATENT DOCUMENTS

| 2002/0029374 A1* | 3/2002 | Moore | G06F 9/44521 |
| | | | 712/E9.083 |
| 2017/0103206 A1* | 4/2017 | Ma | G06F 9/44505 |
| 2020/0372129 A1* | 11/2020 | Gupta | G06F 21/52 |

OTHER PUBLICATIONS

Arm, Arm® Architecture Reference Manual Armv8, for Armv8—A architecture profile, pp. C6-842 to C6-843 and D1-2330 to D1-2331.
Ittai Anati et al., Control Flow Enforcement Technology (CET) Compiler Architecture and Tools Conference (CATC), 2017.
Andrew Waterman et al., The RISC-V Instruction Set Manual vol. II: Privileged Architecture, Dec. 4, 2021, pp. 2 to 4.
Andrew Waterman et al., The RISC-V Instruction Set Manual vol. I: Unprivileged ISA, Dec. 13, 2019, pp. 1 to 12.
Mihai Budiu et al., Architectural Support for Software-Based Protection, Oct. 2006.

* cited by examiner

*Primary Examiner* — William J. Goodchild
(74) *Attorney, Agent, or Firm* — WPAT, P.C.; Anthony King

(57) ABSTRACT

The present application discloses a processor and an attack detection method thereof. The processor includes a first register and an execution unit. The execution unit is configured to: execute a first jump-related instruction under a first privilege mode; set a first field of the first register to a first jump status parameter according to execution of the first jump-related instruction; jump to a first corresponding instruction in a specified register of the first jump-related instruction; determine whether the first corresponding instruction is a legal instruction and whether a first parameter of the first corresponding instruction is equal to the first jump status parameter to obtain a first determination; and determine whether to send an alert message according to the first determination.

20 Claims, 26 Drawing Sheets

PROCESSOR AND ATTACK DETECTION METHOD THEREOF FOR DETECTING JUMP-ORIENTED PROGRAMMING ATTACK

CROSS-REFERENCE TO RELATED APPLICATIONS

This application claims priority to China Application Serial Number 202210889931.6, filed on Jul. 27, 2022, which is incorporated by reference in its entirety.

TECHNICAL FIELD

The present application relates to processor and attack detection method thereof and, more particularly, to a processor and an attack detection method capable of detecting jump-oriented programming (JOP) attacks.

BACKGROUND

Jump-oriented programming (JOP) attacks use jump instruction (for example, BR, BLR instruction of ARM, and JR, JALR instruction of RISC-V) in a program to carry out attacks. When the program executes jump instruction normally, the program retrieves from a specified register of the jump instruction the destination address of their jump. Thus, if an attacker modifies the contents of the specified register by stack overflow, the destination address of the jump can be tampered with. By tampering with the register contents, the attacker can jump to the address of a gadget constructed by the attacker in the course of execution of the program, so as to carry out JOP attacks. Therefore, it is imperative to develop a related detection and alert method in order to preclude JOP attacks.

SUMMARY

An embodiment of the present application provides an attack detection method for use with a processor, comprising the steps of: executing a first jump-related instruction in a first privilege level mode; setting a first field of a first register to a first jump state parameter according to execution of the first jump-related instruction, wherein the first register is for use in the first privilege level mode, and the first field of the first register records an execution state of the first jump-related instruction; jumping to a first corresponding instruction of a specified register of the first jump-related instruction; determining whether the first corresponding instruction is a legal instruction and whether a first parameter of the first corresponding instruction is equal to the first jump state parameter of the first field of the first register to obtain a first determination result; and determining, according to the first determination result, whether to send an alert message.

Another embodiment of the present application provides a processor. The processor comprises a first register and an execution unit. The execution unit is electrically connected to the first register and configured to: execute a first jump-related instruction in the first privilege level mode; set a first field of the first register to a first jump state parameter according to execution of the first jump-related instruction, wherein the first field records an execution state of the first jump-related instruction; jump to a first corresponding instruction of a specified register of the first jump-related instruction; determine whether the first corresponding instruction is a legal instruction and whether a first parameter of the first corresponding instruction is equal to the first jump state parameter of the first field of the first register to obtain a first determination result; and determine, according to the first determination result, whether to send an alert message.

The present application provides a processor and an attack detection method for use with the processor, characterized by: recording execution states of jump-related instructions with a register dedicated to a privilege level mode in which the jump-related instructions are executed; determining, upon jumping to a corresponding instruction of a destination address, whether the corresponding instruction is a legal instruction and whether the parameter of the corresponding instruction conforms with contents of recordation of the dedicated register; and completing attack detection by determining whether the corresponding instruction is the legal instruction or whether the parameter of the corresponding instruction conforms with the contents of recordation of the dedicated register and sending an alert message as needed.

BRIEF DESCRIPTION OF THE DRAWINGS

Aspects of the present disclosure can be better understood by reading the following embodiments in combination with the accompanying drawings below. It should be noted that, according to standard practice in industry, the various structures in the drawings are not drawn to scales. In fact, for description clarity, the sizes of the various structures may be increased or reduced as desired.

DETAILED DESCRIPTION

Figure 1:
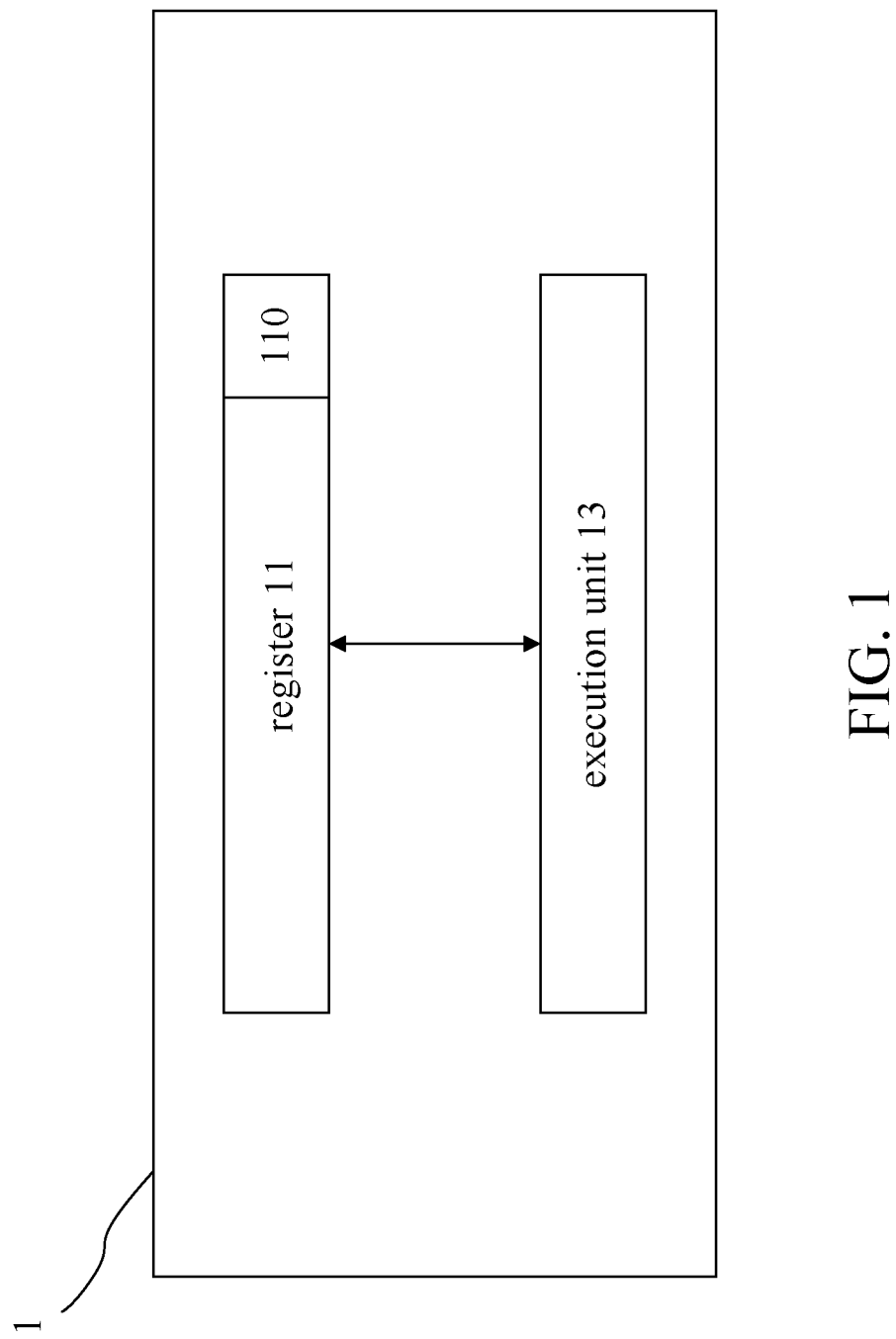
FIG. 1 is a block diagram of a processor according to an embodiment of the application.

The disclosure below provides various different embodiments or examples of different components used to implement the subject matter of the disclosure. Specific examples of components and configurations are given in the description below to simplify the present disclosure. However, such descriptions are merely examples and are not intended to be restrictive. For example, in the description below, a first component formed on or above a second component may include an embodiment in which the first component and the second component are formed in a direct contact manner, and may further include an embodiment in which an additional component is formed between the first component and the second component in a way that the first component and the second component are in indirect contact. Moreover, reference numerals and/or alphabetical symbols may be repeated in the various embodiments of the present disclosure. Such repetition is for the sake of brevity and clarity and does not indicate relations of the various embodiments and/or configurations discussed herein.

Moreover, for better description, for example, relative spatial terms such as "below", "beneath", "under", "above", "on top of" and "over" and the like may be used to describe a relation of one element or component with respect to another element or component illustrated in the drawings. In addition to the orientation depicted in the drawings, the relative spatial terms are intended to cover different orientations of a device in use or in operation. An apparatus may be orientated by other means (rotated by 90 degrees or having another orientation), and descriptive relative spatial terms used herein may also be similarly and correspondingly interpreted.

For example, terms herein such as "first", "second" and "third" are used to describe various elements, components, areas, layers and/or sections, it should be noted that these elements, components, areas, layers and/or sections are not to be limited by such terms. Such terms are used to differentiate one element, component, area, layer or section from another. For example, the terms "first", "second" and "third" used herein do not imply a sequence or order, unless otherwise specified in the contents of the background.

The singular form "a", "one" and "the" may include the plural form, unless otherwise specified in the context. The term "connect/couple" and its derivatives are used to describe structural relations of parts herein. The term "connect/couple" may be used to describe that two or more elements are in direct physical or electrical contact with each other. The term "connect/couple" may be used to indicate that two or more elements are in direct or indirect (with an intermediate element in between) physical or electrical contact with each other, and/or these two or more elements coordinate or interact with each other.

FIG. 1 is a block diagram of a processor 1 according to an embodiment of the application. The processor 1 comprises a register 11 and an execution unit 13. The execution unit 13 is coupled to and/or electrically connected to the register 11. The register 11 is for use in a first privilege level mode. Furthermore, the register 11 records an instruction jump state in the first privilege level mode. Modules are electrically connected to transmit data and signals. Related details and operation are further described below.

In some embodiments, the execution unit 13 loads and executes the program, and executes a first jump-related instruction in the program in the first privilege level mode. The execution unit 13 sets a field 110 of the register 11 to a first jump state parameter according to the execution of the first jump-related instruction. The field 110 of the register 11 records an execution state of the first jump-related instruction.

Then, in the course of execution of the program, the execution unit 13 jumps to a corresponding instruction of the specified register of the first jump-related instruction. The execution unit 13 determines whether the corresponding instruction is a legal instruction and whether the parameter of the corresponding instruction is equal to the first jump state parameter of the field 110 of the register 11.

When the execution unit 13 determines that the corresponding instruction is not a legal instruction, the execution unit 13 sends an alert message. When the execution unit 13 determines that the corresponding instruction is a legal instruction, the execution unit 13 further determines whether the parameter of the corresponding instruction is equal to the first jump state parameter of the field 110 of the register 11. When the execution unit 13 determines that the parameter of the corresponding instruction is not equal to the first jump state parameter of the field 110 of the register 11, the execution unit 13 sends an alert message. When the execution unit 13 determines that the parameter of the corresponding instruction is equal to the first jump state parameter of the field 110 of the register 11, the execution unit 13 does not send an alert message. For the sake of illustration, the application is explained below with examples.

Figure 2A:
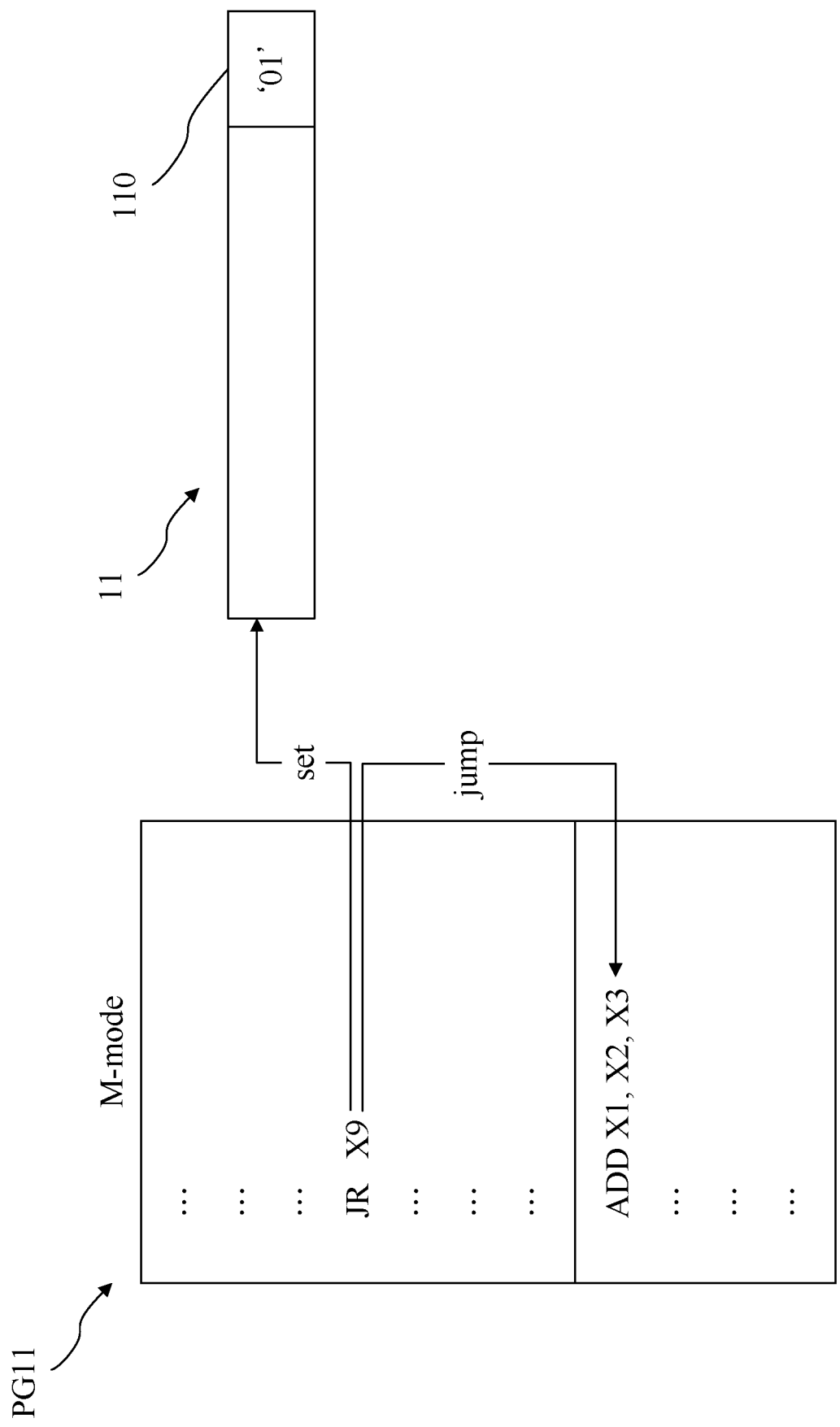
FIG. 2A to FIG. 2C are schematic views of examples of JOP attack detection.
Figure 2B:
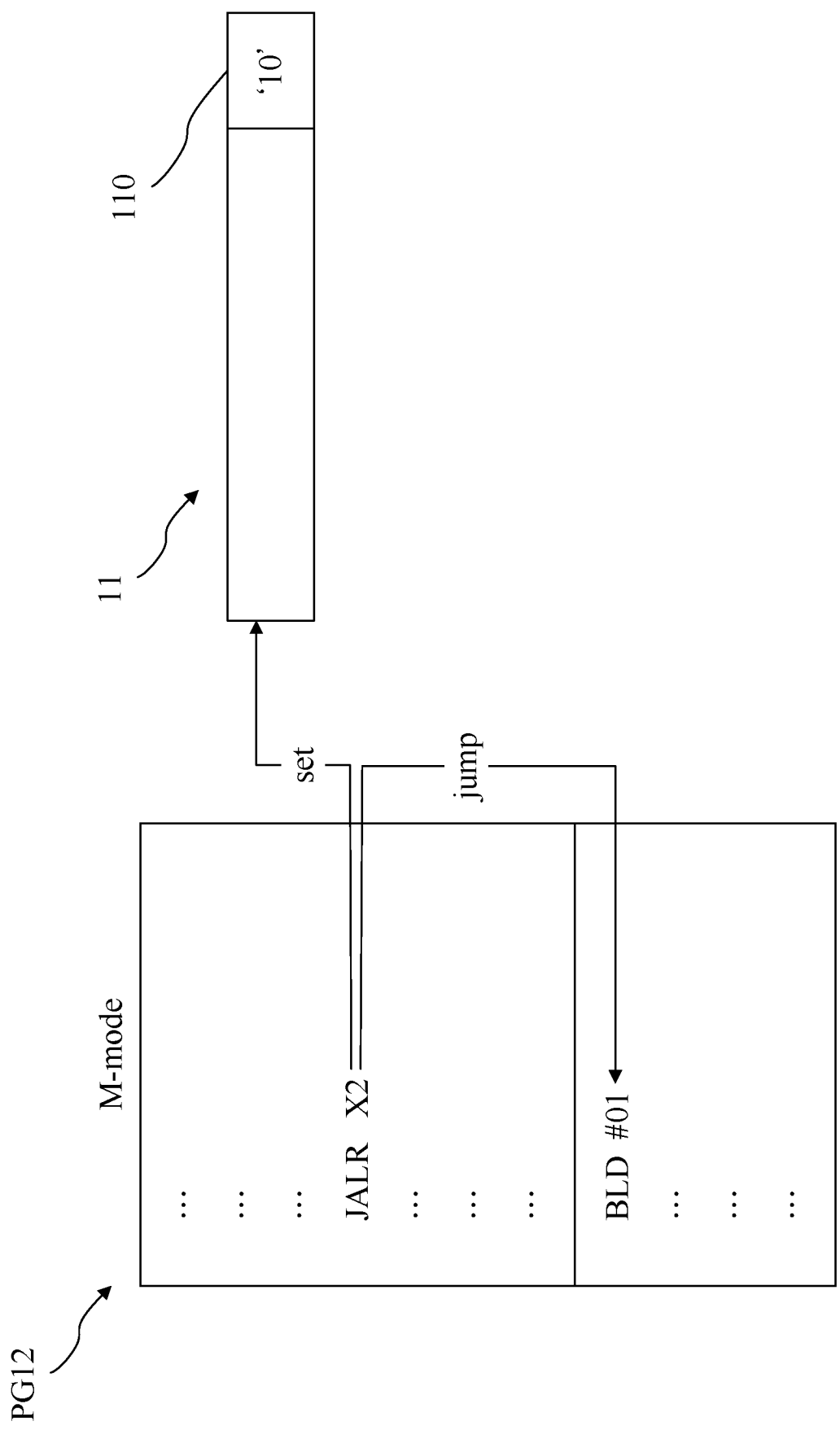
Figure 2C:
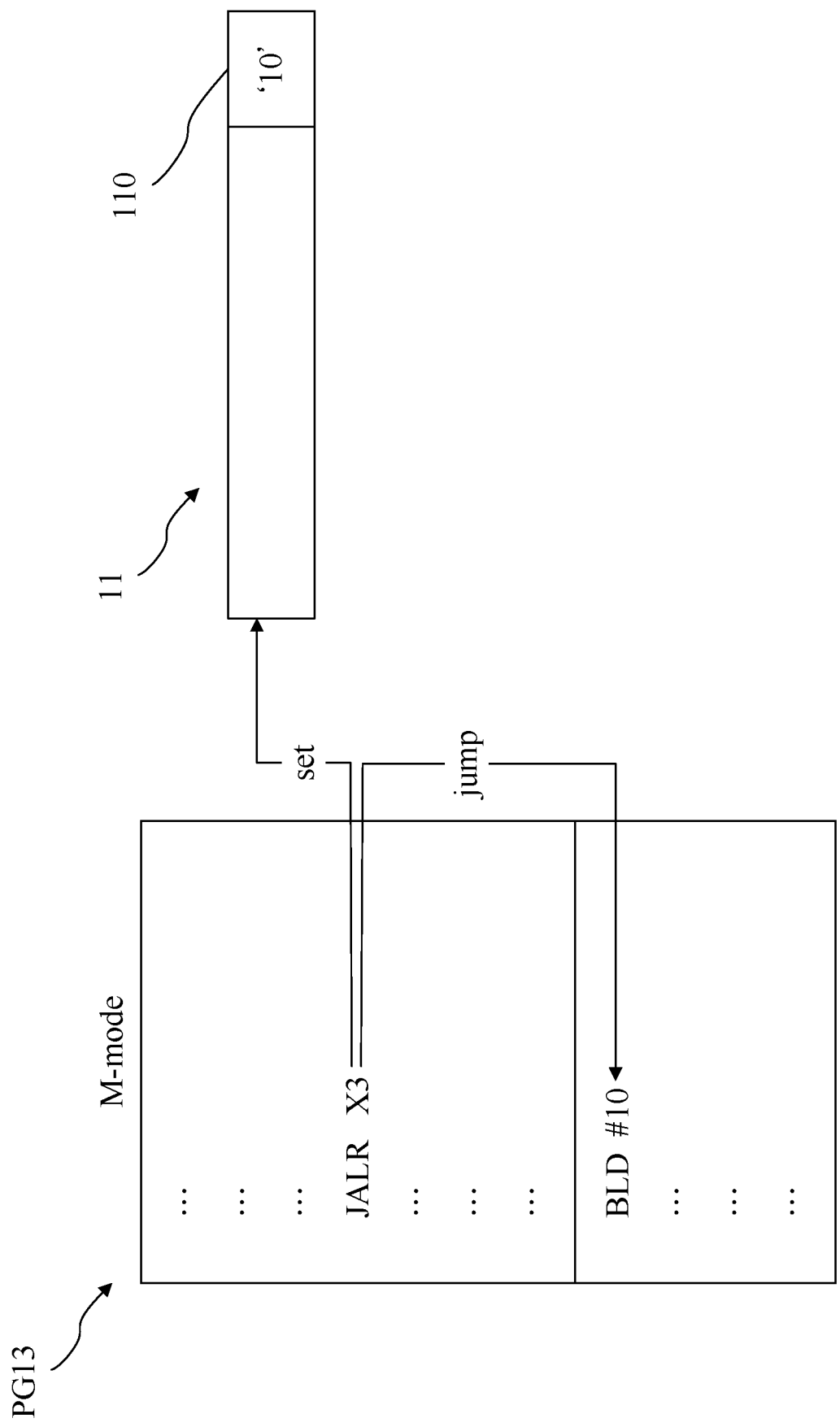

FIG. 2A through FIG. 2C are schematic views of examples of jump-oriented programming (JOP) attack detection of the application. The examples are about operation in RISC-V framework, and the jump-related instructions include existing jump and link instruction JALR and jump instruction JR in RISC-V framework. JR-related jump state parameter is a first value (for example, '01'). JALR-related jump state parameter is a second value (for example, '10'). Other instructions-related jump state parameter is a third value (for example, '00'). Moreover, in the examples, a legal instruction is BLD of the framework of the application, the parameter of legal instruction BLD is #IMM (instruction BLD is executed by, for example, BLD #IMM). In some embodiments, legal instruction BLD is implemented by existing addition instruction ADDI (for example, ADDI X0, X0, #IMM) in RISC-V framework. However, the examples are not restrictive of implementation of the application.

Referring to FIG. 2A, the execution unit 13 loads and executes program PG11, and executes jump instruction JR in program PG11 in a machine mode (M-mode). The execution unit 13 sets the field 110 of the register 11 to a first jump state parameter according to the execution of jump instruction JR. The first jump state parameter has a value of '01'.

Then, in the course of execution of program PG11, the execution unit 13 jumps to the corresponding instruction of specified register X9 of jump instruction JR. The execution unit 13 determines whether the corresponding instruction is legal instruction BLD and whether the parameter of the corresponding instruction is equal to the first jump state parameter of the field 110 of the register 11. In this example, the execution unit 13 determines that the corresponding instruction is instruction ADD, as opposed to legal instruction BLD. Therefore, the execution unit 13 sends an alert message (i.e., exception report).

Referring to FIG. 2B, the execution unit 13 loads and executes program PG12, and executes jump and link instruction JALR in program PG12 in a supervisor mode (S-mode). The execution unit 13 sets the field 110 of the register 11 to a first jump state parameter according to the execution of jump and link instruction JALR. The first jump state parameter has a value of '10'.

Then, in the course of execution of program PG12, the execution unit 13 jumps to the corresponding instruction of specified register X2 of jump and link instruction JALR. The execution unit 13 determines whether the corresponding instruction is legal instruction BLD and whether the parameter of the corresponding instruction is equal to the first jump state parameter of the field 110 of the register 11. If the parameter of the corresponding instruction is equal to first value '01', the corresponding instruction should correspond to jump instruction JR. If the parameter of the corresponding instruction is equal to second value '10', the corresponding instruction should correspond to jump and link instruction JALR. If the parameter of the corresponding instruction is equal to third value '11', the corresponding instruction should correspond to jump instruction JR or jump and link instruction JALR. If the parameter of the corresponding instruction is equal to fourth value '00', the corresponding instruction should correspond to the other instructions.

In this example, the execution unit 13 determines that the corresponding instruction is legal instruction BLD, and further determines that the parameter of BLD is not equal to the first jump state parameter of the field 110 of the register 11. Thus, it is determined that parameter '01' of the corresponding instruction should not correspond to second value '10'. Therefore, the execution unit 13 sends an alert message (i.e., exception report).

Referring to FIG. 2C, the execution unit 13 loads and executes program PG13, and executes jump and link instruction JALR in program PG13 in a hypervisor-extended supervisor mode (HS-mode). The execution unit 13 sets the field 110 of the register 11 to the first jump state parameter according to the execution of jump and link instruction JALR. The first jump state parameter has a value of '10'.

Then, in the course of execution of program PG13, the execution unit 13 jumps to the corresponding instruction of specified register X3 of jump and link instruction JALR. The execution unit 13 determines whether the corresponding instruction is legal instruction BLD and whether the parameter of the corresponding instruction is equal to the first jump state parameter of the field 110 of the register 11. In this example, the execution unit 13 determines that the corresponding instruction is legal instruction BLD, and further determines that the parameter of BLD is equal to the first jump state parameter of the field 110 of the register 11. Therefore, the execution unit 13 continues to execute the program.

Figure 3:
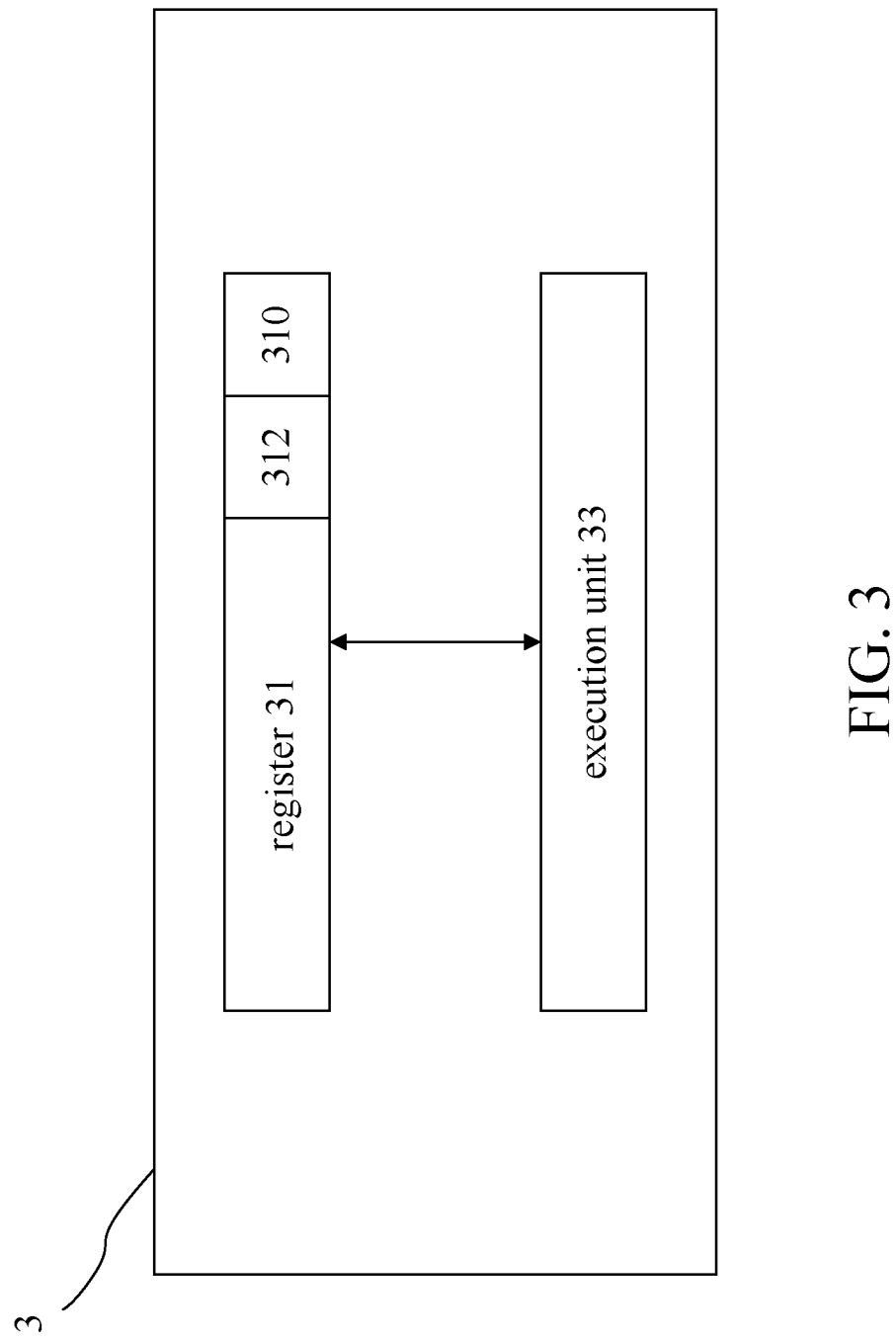
FIG. 3 is a block diagram of a processor according to an embodiment of the application.

FIG. 3 is a block diagram of a processor 3 according to an embodiment of the application. The processor 3 comprises a register 31 and an execution unit 33. The execution unit 33 is coupled to and/or electrically connected to the register 31. In this embodiment, the register 31 is for use in the first privilege level mode and a second privilege level mode simultaneously. Furthermore, the register 31 records different instruction jump states, including fields 310, 312, in the two privilege level modes. The field 310 records the execution state of the jump-related instructions executed in a low-authority privilege level mode. The field 312 records the execution state of the jump-related instructions executed in a high-authority privilege level mode. Modules are electrically connected to transmit data and signals. Related details and operation are further described below.

In some embodiments, the execution unit 33 loads and executes the program, and executes the first jump-related instruction in the program in the first privilege level mode (low-authority privilege level mode). The execution unit 33 sets the field 310 of the register 31 to the first jump state parameter according to the execution of the first jump-related instruction. Then, the execution unit 33 receives a first interruption in the first privilege level mode and enters (i.e., is trapped to) the second privilege level mode (high-authority privilege level mode) according to the first interruption. To prevent the execution carried out after the first interruption from affecting jump state recordation, the execution unit 33 stores the value of the field 310 of the register 31 to the field 312 of the register 31 according to the first interruption.

Then, in the course of execution of the program, the execution unit 33 executes a second jump-related instruction in the second privilege level mode. The execution unit 33 sets the field 310 of the register 31 to a second jump state parameter according to the execution of the second jump-related instruction. Then, the execution unit 33 jumps to the corresponding instruction of the specified register of the second jump-related instruction. The execution unit 33 determines whether the corresponding instruction is a legal instruction and whether the parameter of the corresponding instruction is equal to the second jump state parameter of the field 310 of the register 31.

When the execution unit 33 determines that the corresponding instruction is not a legal instruction, the execution unit 33 sends an alert message. When the execution unit 33 determines that the corresponding instruction is a legal instruction, the execution unit 33 further determines whether the parameter of the corresponding instruction is equal to the second jump state parameter of the field 310 of the register 31. When the execution unit 33 determines that the parameter of the corresponding instruction is not equal to the second jump state parameter of the field 310 of the register 31, the execution unit 33 sends an alert message. When the execution unit 33 determines that the parameter of the corresponding instruction is equal to the second jump state parameter of the field 310 of the register 31, the execution unit 33 does not send an alert message.

Then, in the course of execution of the program, the execution unit 33 executes the first interruption return. The execution unit 33 returns to the first privilege level mode according to the execution of the first interruption return and stores the value of the field 312 of the register 31 to the field 310 of the register 31. Then, the execution unit 33 jumps to a corresponding instruction of the specified register of the first jump-related instruction. The execution unit 33 determines whether the corresponding instruction is a legal instruction and whether the parameter of the corresponding instruction is equal to the first jump state parameter of the field 310 of the register 31.

When the execution unit 33 determines that the corresponding instruction is not a legal instruction, the execution unit 33 sends an alert message. When the execution unit 33 determines that the corresponding instruction is a legal instruction, the execution unit 33 further determines whether the parameter of the corresponding instruction is equal to the first jump state parameter of the field 310 of the register 31. When the execution unit 33 determines that the parameter of the corresponding instruction is not equal to the first jump state parameter of the field 310 of the register 31, the execution unit 33 sends an alert message. When the execution unit 33 determines that the parameter of the corresponding instruction is equal to the first jump state parameter of the field 310 of the register 31, the execution unit 33 does not send an alert message. For the sake of illustration, the application is explained below with examples.

Figure 4A:
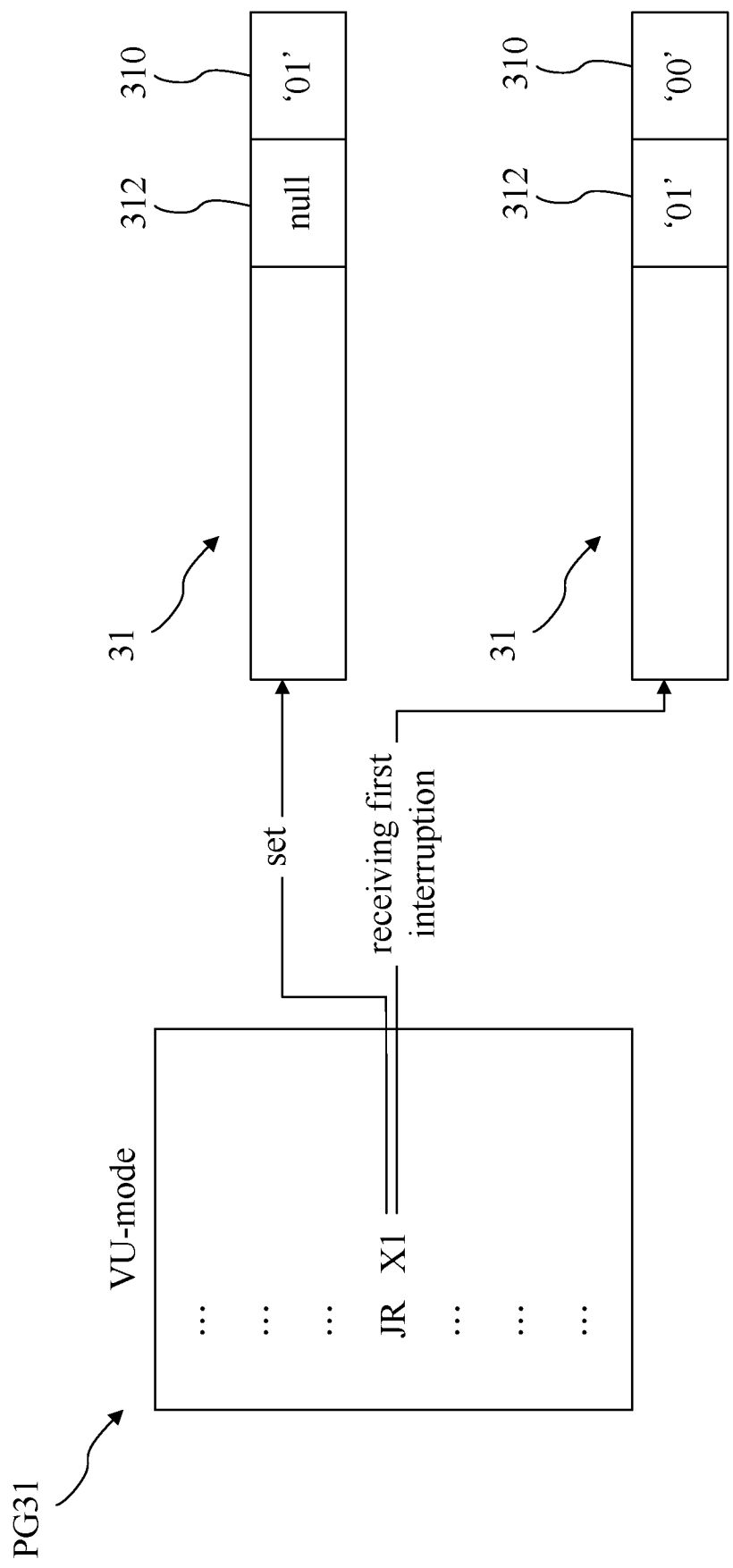
FIG. 4A to FIG. 4C are schematic views of an example of JOP attack detection.
Figure 4B:
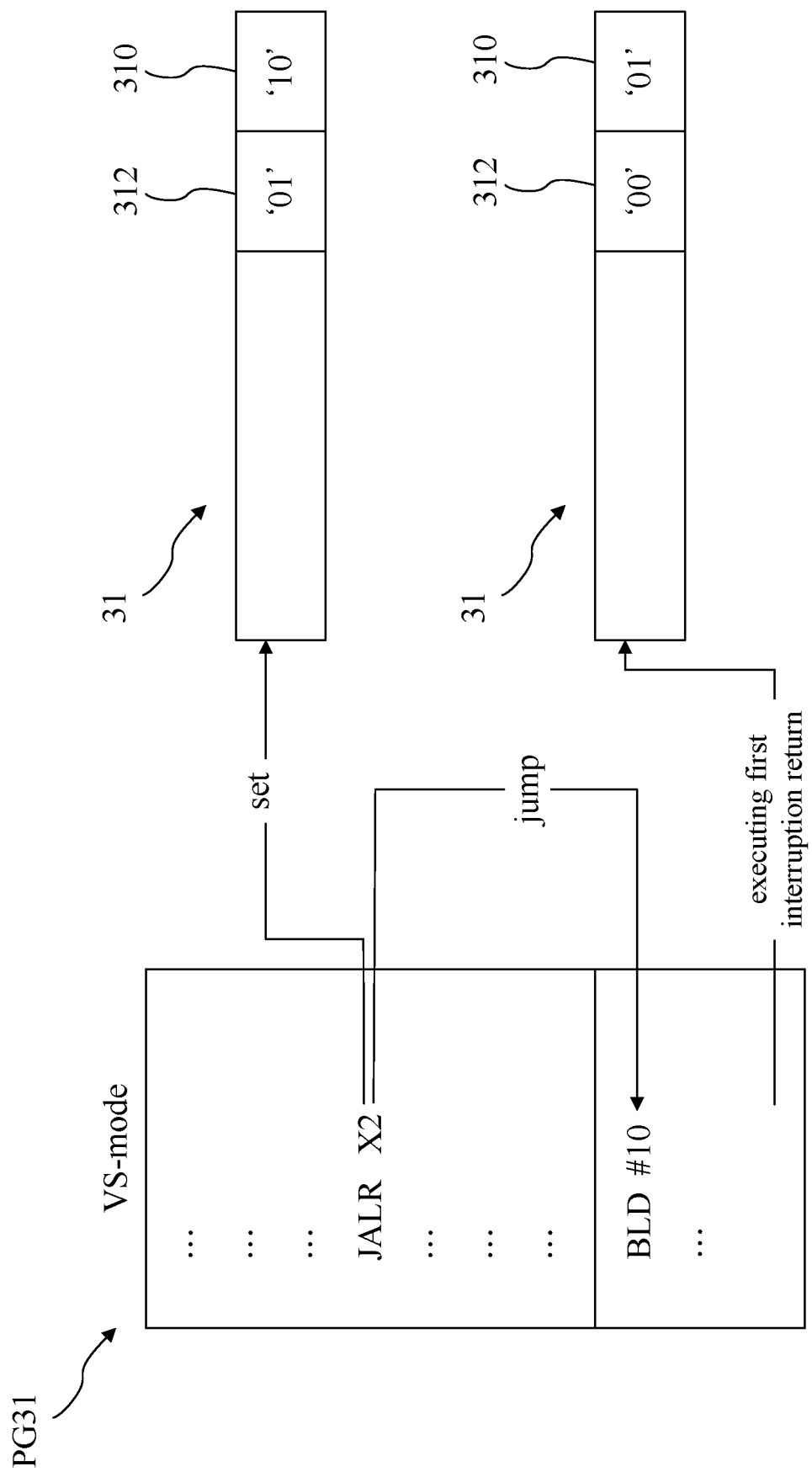
Figure 4C:
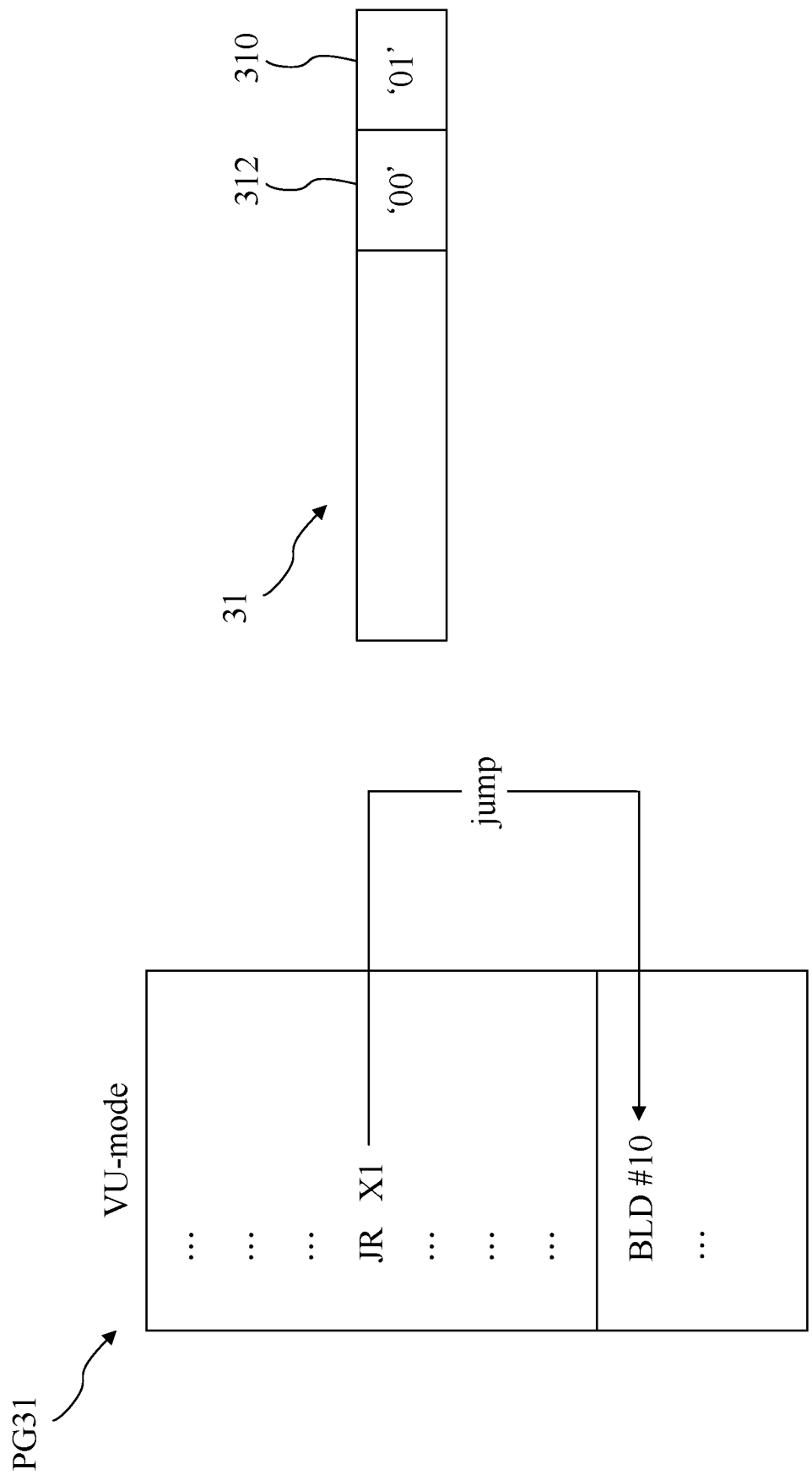

FIG. 4A through FIG. 4C are schematic views of an example of JOP attack detection of the application. The example is about operation in RISC-V framework, and the jump-related instructions include existing jump instruction JR and jump and link instruction JALR in RISC-V framework. JR-related jump state parameter is a first value (for example, '01'). JALR-related jump state parameter is a second value (for example, '10'). Other instructions-related jump state parameter is a third value (for example, '00'). Moreover, in the example, the legal instruction is BLD of the framework of the application, and the parameter of legal instruction BLD is #IMM (instruction BLD is executed by, for example, BLD #IMM). In some embodiments, the legal instruction BLD is implemented by existing addition instruction ADDI (for example, ADDI X0, X0, #IMM) in RISC-V framework. Moreover, in the example, the low-authority privilege level mode is a virtualized user mode (VU-mode), and the high-authority privilege level mode is a virtualized supervisor mode (VS-mode). However, the example is not restrictive of implementation of the application.

Referring to FIG. 4A, the execution unit 33 loads and executes program PG31, and executes jump instruction JR in program PG31 in the VU-mode. The execution unit 33 sets the field 310 of the register 31 to the first jump state parameter according to the execution of jump instruction JR. The first jump state parameter has a value of '01'. Then, the execution unit 33 receives the first interruption and enters (i.e., is trapped to) the VS-mode according to the first interruption. To prevent the execution carried out after the first interruption from affecting jump state recordation, the execution unit 33 stores the value of the field 310 of the register 31 to the field 312 of the register 31 according to the first interruption and sets the value of the field 310 of the register 31 to '00'.

Referring to FIG. 4B, in the course of execution of the program, the execution unit 33 executes jump and link instruction JALR in the VS-mode. The execution unit 33 sets the field 310 of the register 31 to the second jump state parameter according to the execution of jump and link instruction JALR. The second jump state parameter has a value of '10'. Then, the execution unit 33 jumps to the corresponding instruction of specified register X2 of jump and link instruction JALR. The execution unit 33 determines whether the corresponding instruction is a legal instruction BLD and whether the parameter of the corresponding instruction is equal to the second jump state parameter of the field 310 of the register 31. In this example, the execution unit 33 determines that the corresponding instruction is a legal instruction BLD, and further determines that the parameter of BLD is equal to the second jump state parameter of the field 310 of the register 31. Therefore, the execution unit 33 continues to execute the program. Then, in the course of execution of the program, the execution unit 33 executes the first interruption return. The execution unit 33 returns to the VU-mode according to the execution of the first interruption return, stores the value of the field 312 of the register 31 to the field 310 of the register 31, and sets the value of the field 312 of the register 31 to '00'.

Referring to FIG. 4C, the execution unit 33 jumps to the corresponding instruction of specified register X1 of jump instruction JR. The execution unit 33 determines whether the corresponding instruction is legal instruction BLD and whether the parameter of the corresponding instruction is equal to the first jump state parameter of the field 310 of the register 31. If the parameter of the corresponding instruction is equal to first value '01', the corresponding instruction should correspond to jump instruction JR. If the parameter of the corresponding instruction is equal to second value '10', the corresponding instruction should correspond to jump and link instruction JALR. If the parameter of the corresponding instruction is equal to third value '11', the corresponding instruction should correspond to jump instruction JR or jump and link instruction JALR. If the parameter of the corresponding instruction is equal to fourth value '00', the corresponding instruction should correspond to the other instructions.

In this example, the execution unit 33 determines that the corresponding instruction is legal instruction BLD, and further determines that the parameter of BLD is not equal to the first jump state parameter of the field 310 of the register 31. Thus, it determines that the parameter '10' of the corresponding instruction does not have to correspond to first value '01'. Therefore, the execution unit 33 sends an alert message (i.e., exception report).

Figure 5:
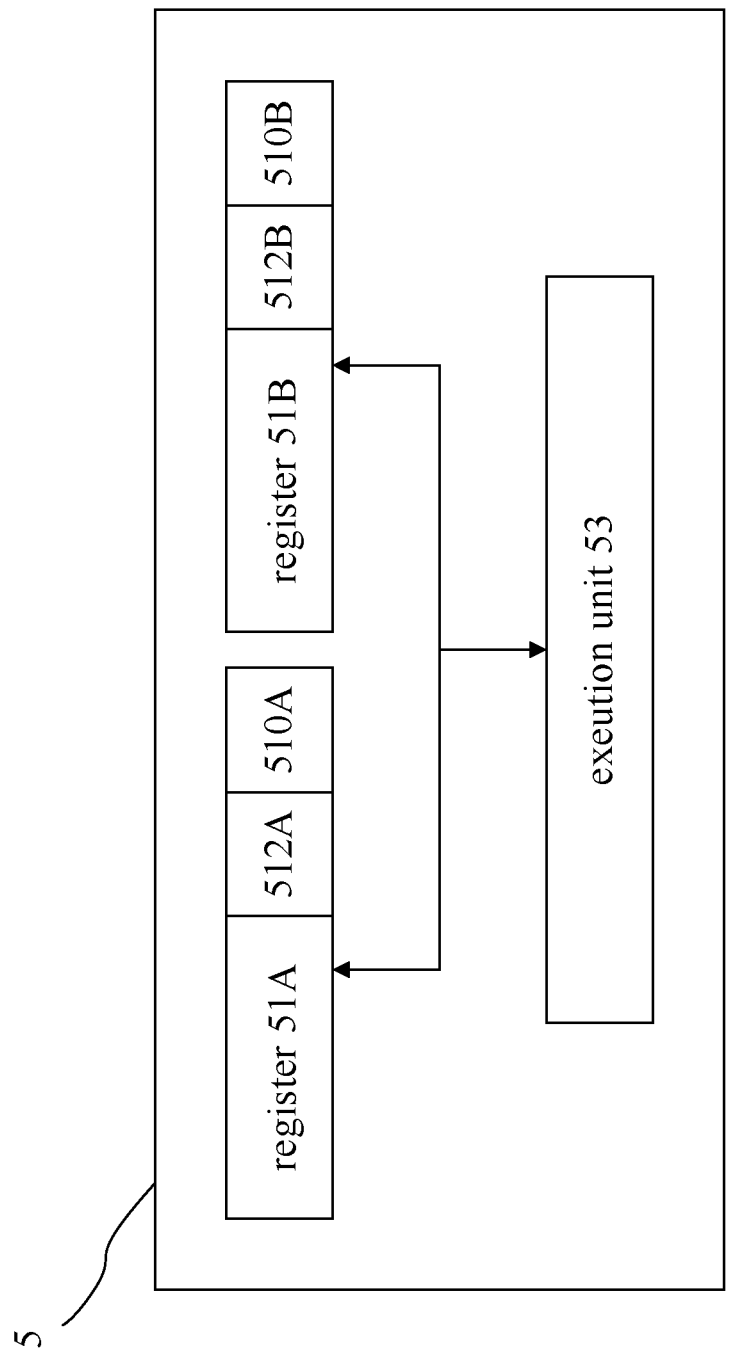
FIG. 5 is a block diagram of a processor according to an embodiment of the application.

FIG. 5 is a block diagram of a processor 5 according to an embodiment of the application. The processor 5 comprises registers 51A, 51B and an execution unit 53. The execution unit 53 is coupled to and/or electrically connected to the registers 51A, 51B. In this embodiment, the register 51A is for use in the first privilege level mode, and the register 51B is for use in the second privilege level mode. Furthermore, the register 51A records different instruction jump states, including fields 510A, 512A, in the first privilege level mode. The field 510A records the execution state of the jump-related instructions executed in the first privilege level mode. The field 512A records the execution state of the jump-related instructions executed in the preceding privilege level mode. The register 51B records different instruction jump states, including fields 510B, 512B, in the second privilege level mode. The field 510B records the execution state of the jump-related instructions executed in the second privilege level mode. The field 512B records the execution state of the jump-related instructions executed in the preceding privilege level mode. Modules are electrically connected to transmit data and signals. Related details and operation are further described below.

In some embodiments, the execution unit 53 loads and executes the program, and executes the first jump-related instruction in the program in the first privilege level mode (low-authority privilege level mode). The execution unit 53 sets the field 510A of the register 51A to the first jump state parameter according to the execution of the first jump-related instruction. Then, the execution unit 53 receives the first interruption in the first privilege level mode and enters (i.e., is trapped to) the second privilege level mode (high-authority privilege level mode) according to the first interruption. To prevent the execution carried out after the first interruption from affecting jump state recordation, the execution unit 53 stores the value of the field 510A of the register 51A to the field 512B of the register 51B according to the first interruption.

Then, in the course of execution of the program, the execution unit 53 executes the second jump-related instruction in the second privilege level mode. The execution unit 53 sets the field 510B of the register 51B to the second jump state parameter according to the execution of the second jump-related instruction. Then, the execution unit 53 jumps to the corresponding instruction of the specified register of the second jump-related instruction. The execution unit 53 determines whether the corresponding instruction is a legal instruction and whether the parameter of the corresponding instruction is equal to the second jump state parameter of the field 510B of the register 51B.

When the execution unit 53 determines that the corresponding instruction is not a legal instruction, the execution unit 53 sends an alert message. When the execution unit 53 determines that the corresponding instruction is a legal instruction, the execution unit 53 further determines whether the parameter of the corresponding instruction is equal to the second jump state parameter of the field 510B of the register 51B. When the execution unit 53 determines that the parameter of the corresponding instruction is not equal to the second jump state parameter of the field 510B of the register 51B, the execution unit 53 sends an alert message. When the execution unit 53 determines that the parameter of the corresponding instruction is equal to the second jump state parameter of the field 510B of the register 51B, the execution unit 53 does not send an alert message.

Then, in the course of execution of the program, the execution unit 53 executes the first interruption return. The execution unit 53 returns to the first privilege level mode according to the execution of the first interruption return and stores the value of the field 512B of the register 51B to the field 510A of the register 51A. Then, the execution unit 53 jumps to a corresponding instruction of the specified register of the first jump-related instruction. The execution unit 53 determines whether the corresponding instruction is a legal instruction and whether the parameter of the corresponding instruction is equal to the first jump state parameter of the field 510A of the register 51A.

When the execution unit 53 determines that the corresponding instruction is not a legal instruction, the execution unit 53 sends an alert message. When the execution unit 53 determines that the corresponding instruction is a legal instruction, the execution unit 53 further determines whether the parameter of the corresponding instruction is equal to the first jump state parameter of the field 510A of the register 51A. When the execution unit 53 determines that the parameter of the corresponding instruction is not equal to the first jump state parameter of the field 510A of the register 51A, the execution unit 53 sends an alert message. When the execution unit 53 determines that the parameter of the corresponding instruction is equal to the first jump state parameter of the field 510A of the register 51A, the execution unit 53 does not send an alert message. For the sake of illustration, the application is explained below with examples.

Figure 6A:
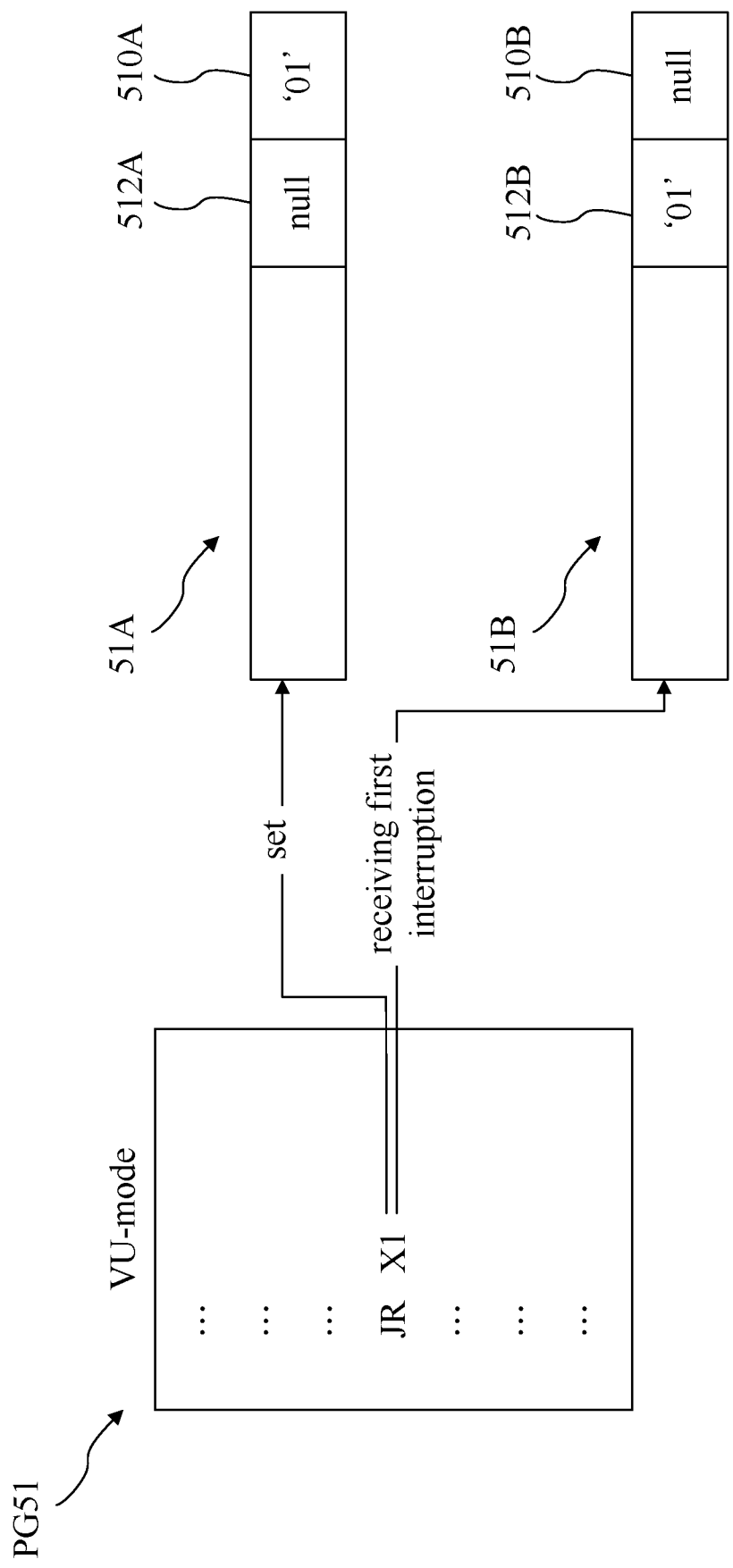
FIG. 6A to FIG. 6C are schematic views of an example of JOP attack detection.
Figure 6B:
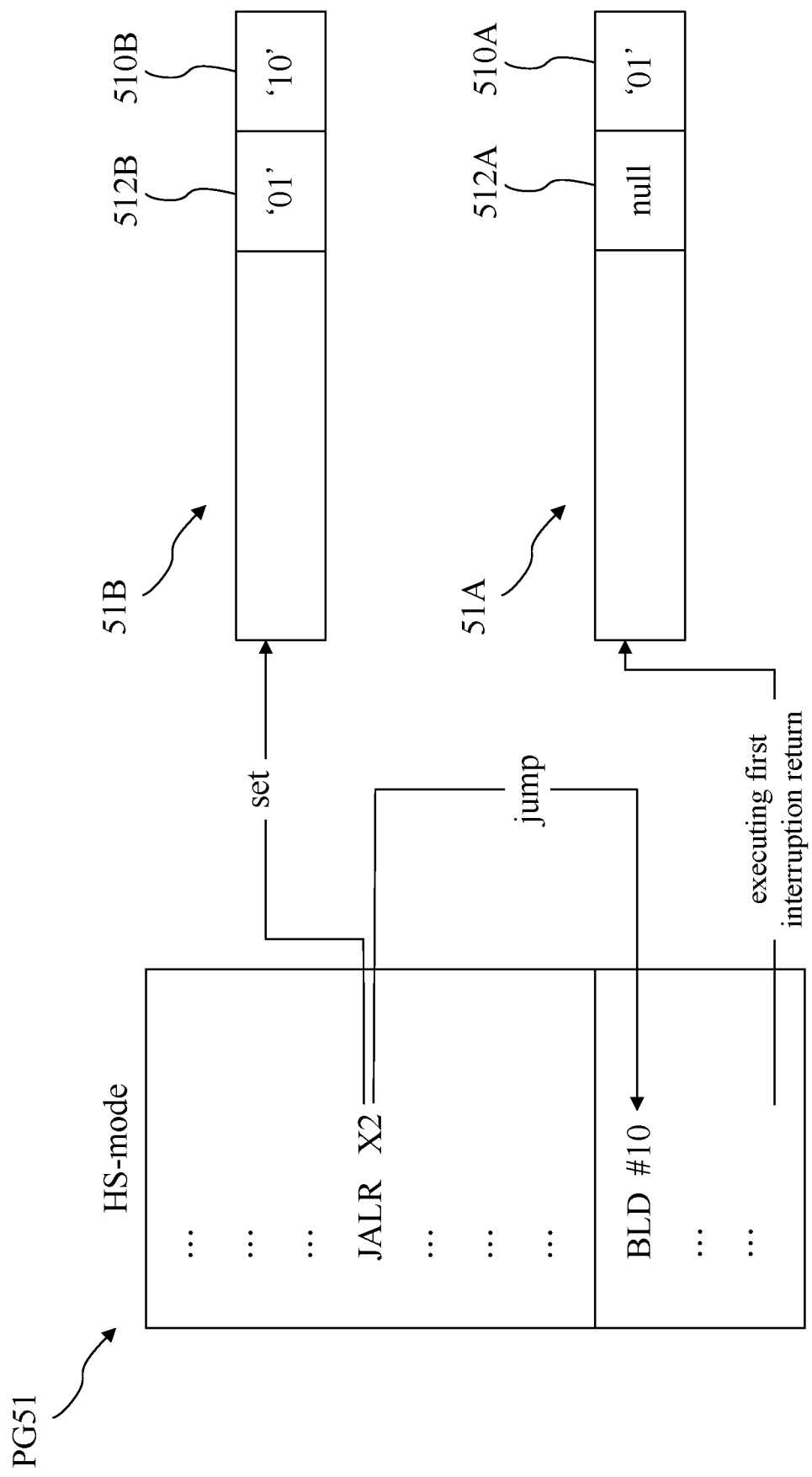
Figure 6C:
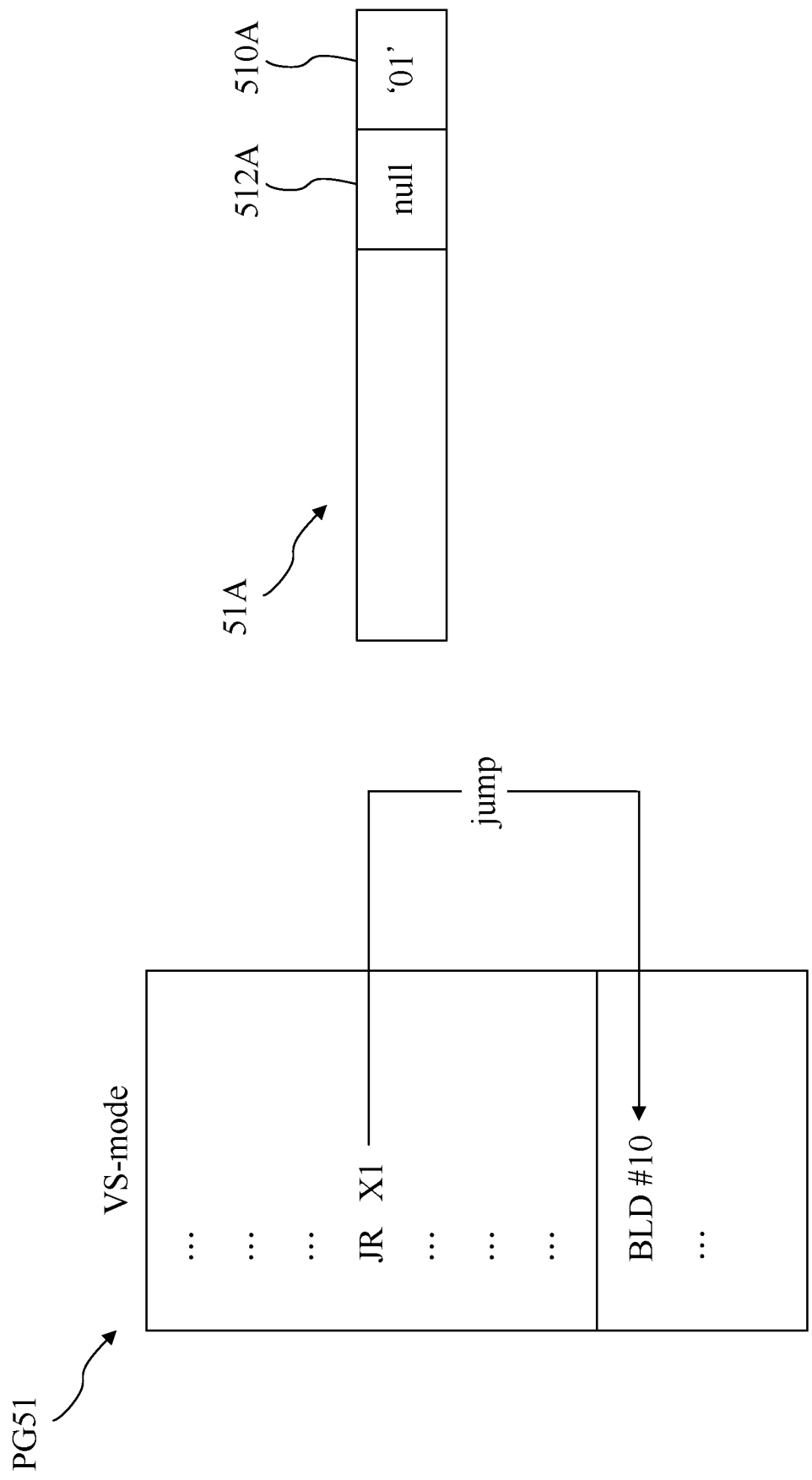

FIG. 6A through FIG. 6C are schematic views of an example of JOP attack detection of the application. The example is about operation in RISC-V framework, and the jump-related instructions include existing jump instruction JR and jump and link instruction JALR in RISC-V framework. JR-related jump state parameter is a first value (for example, '01'). JALR-related jump state parameter is a second value (for example, '10'). Other instructions-related jump state parameter is a third value (for example, '00'). Moreover, in the example, the legal instruction is BLD of the framework of the application, and the parameter of legal instruction BLD is #IMM (instruction BLD is executed by, for example, BLD #IMM). In some embodiments, the legal instruction BLD is implemented by existing addition instruction ADDI (for example, ADDI X0, X0, #IMM) in RISC-V framework. However, the example is not restrictive of implementation of the application.

Referring to FIG. 6A, the execution unit 53 loads and executes program PG51, and executes jump instruction JR in program PG51 in the VU-mode. The execution unit 53 sets the field 510A of the register 51A to the first jump state parameter according to the execution of jump instruction JR. The first jump state parameter has a value of '01'. Then, the execution unit 53 receives the first interruption and enters (i.e., is trapped to) the HS-mode according to the first interruption. To prevent the execution carried out after the first interruption from affecting jump state recordation, the execution unit 53 stores the value of the field 510A of the register 51A to the field 512B of the register 51B according to the first interruption and sets the value of the field 510A of the register 51A to '00'.

Referring to FIG. 6B, in the course of execution of the program, the execution unit 53 executes jump and link instruction JALR in the HS-mode. The execution unit 53 sets the field 510B of the register 51B to the second jump state parameter according to the execution of jump and link instruction JALR. The second jump state parameter has a value of '10'. Then, the execution unit 53 jumps to the corresponding instruction of specified register X2 of jump and link instruction JALR. The execution unit 53 determines whether the corresponding instruction is legal instruction BLD and whether the parameter of the corresponding instruction is equal to the second jump state parameter of the field 510B of the register 51B. In this example, the execution unit 53 determines that the corresponding instruction is legal instruction BLD, and further determines that the parameter of BLD is equal to the second jump state parameter of the field 510B of the register 51B. Therefore, the execution unit 53 continues to execute the program. Then, in the course of execution of the program, the execution unit 53 executes the first interruption return. The execution unit 53 returns to the VS-mode according to the execution of the first interruption return, stores the value of the field 512B of the register 51B to the field 510A of the register 51A, and sets the value of the field 512B of the register 51B to '00'.

Referring to FIG. 6C, the execution unit 53 jumps to the corresponding instruction of specified register X1 of jump instruction JR. The execution unit 53 determines whether the corresponding instruction is legal instruction BLD and whether the parameter of the corresponding instruction is equal to the first jump state parameter of the field 510A of the register 51A. If the parameter of the corresponding instruction is equal to first value '01', the corresponding instruction should correspond to jump instruction JR. If the parameter of the corresponding instruction is equal to second value '10', the corresponding instruction should correspond to jump and link instruction JALR. If the parameter of the corresponding instruction is equal to third value '11', the corresponding instruction should correspond to jump instruction JR or jump and link instruction JALR. If the parameter of the corresponding instruction is equal to fourth value '00', the corresponding instruction should correspond to the other instructions.

In the example, the execution unit 53 determines that the corresponding instruction is legal instruction BLD, and further determines that the parameter of BLD is not equal to the first jump state parameter of the field 510A of the register 51A. Thus, it determines that the parameter '10' of the corresponding instruction does not have to correspond to first value '01'. Therefore, the execution unit 53 sends an alert message (i.e., exception report).

Figure 7:
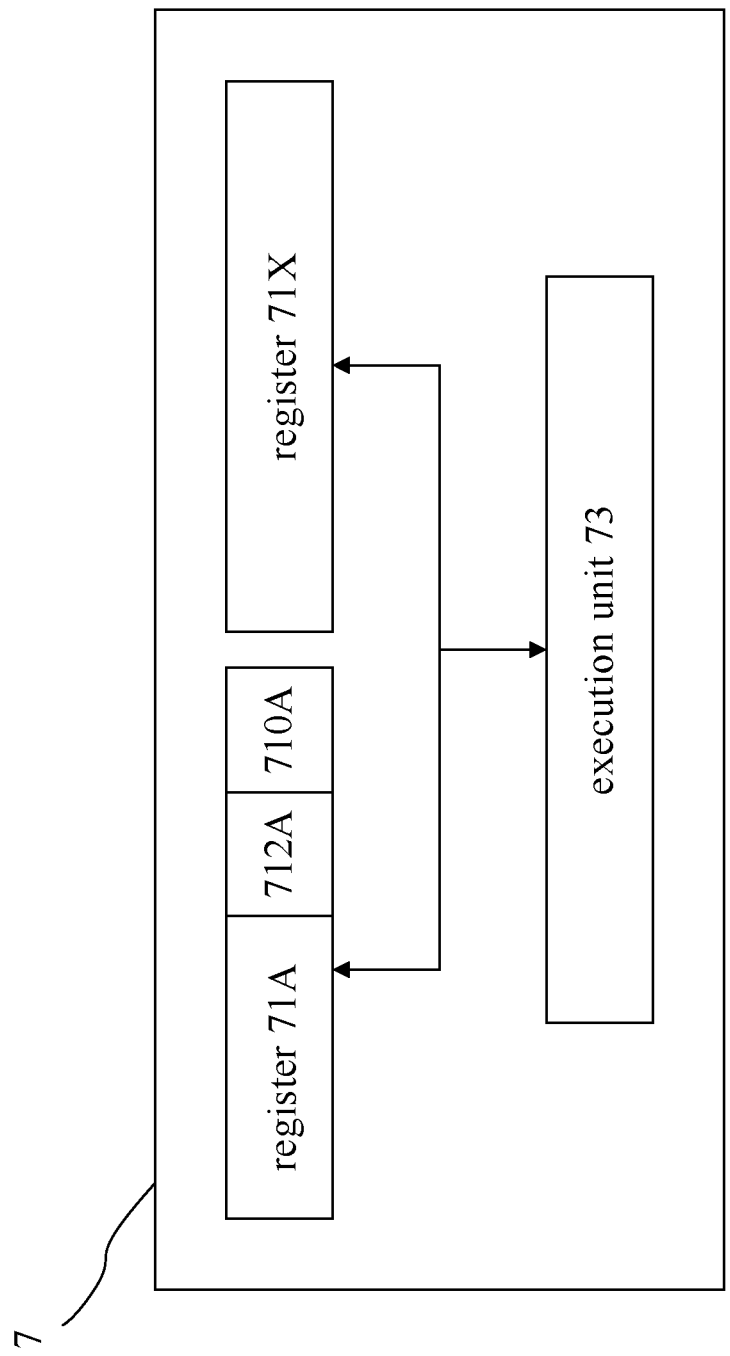
FIG. 7 is a block diagram of a processor according to an embodiment of the application.

FIG. 7 is a block diagram of a processor 7 according to an embodiment of the application. The processor 7 comprises registers 71A, 71X and an execution unit 73. The execution unit 73 is coupled to and/or electrically connected to the registers 71A, 71X. In this embodiment, the register 71A is for use in the first privilege level mode, and the register 71X is a temporary register. Furthermore, the register 71A records different instruction jump states, including fields 710A, 712A, in the first privilege level mode. The field 710A records the execution state of the jump-related instructions executed in the first privilege level mode. The field 712A records the execution state of the jump-related instructions executed in the preceding privilege level mode. Modules are electrically connected to transmit data and signals. Related details and operation are further described below.

In some embodiments, the execution unit 73 loads and executes the program, and prepares for execution of the first jump-related instruction in the program in the first privilege level mode. Before executing the first jump-related instruction, the execution unit 73 stores all the values of the register 71A to the register 71X. The execution unit 73 sets the field 710A of the register 71A to the first jump state parameter according to the execution of the first jump-related instruction. Then, the execution unit 73 receives the first interruption in the first privilege level mode and enters (i.e., is trapped to) the same privilege level mode (i.e., the first privilege level mode) according to the first interruption. To prevent the execution carried out after the first interruption from affecting jump state recordation, the execution unit 73 stores the value of the field 710A of the register 71A to the field 712A of the register 71A according to the first interruption.

Then, in the course of execution of the program, the execution unit 73 executes the first interruption return. The execution unit 73 returns to the first privilege level mode according to the execution of the first interruption return and stores the value of the field 712A of the register 71A to the field 710A of the register 71A. Then, the execution unit 73 jumps to a corresponding instruction of the specified register of the first jump-related instruction. The execution unit 73 determines whether the corresponding instruction is a legal instruction and whether the parameter of the corresponding instruction is equal to the first jump state parameter of the field 710A of the register 71A.

After determining that the corresponding instruction is a legal instruction and that the parameter of the corresponding instruction is equal to the first jump state parameter of the field 710A of the register 71A, the execution unit 73 does not send an alert message. Then, upon completion of execution of the corresponding instruction, the execution unit 73 stores all the values of the register 71X to the register 71A. For the sake of illustration, the application is explained below with examples.

Figure 8A:
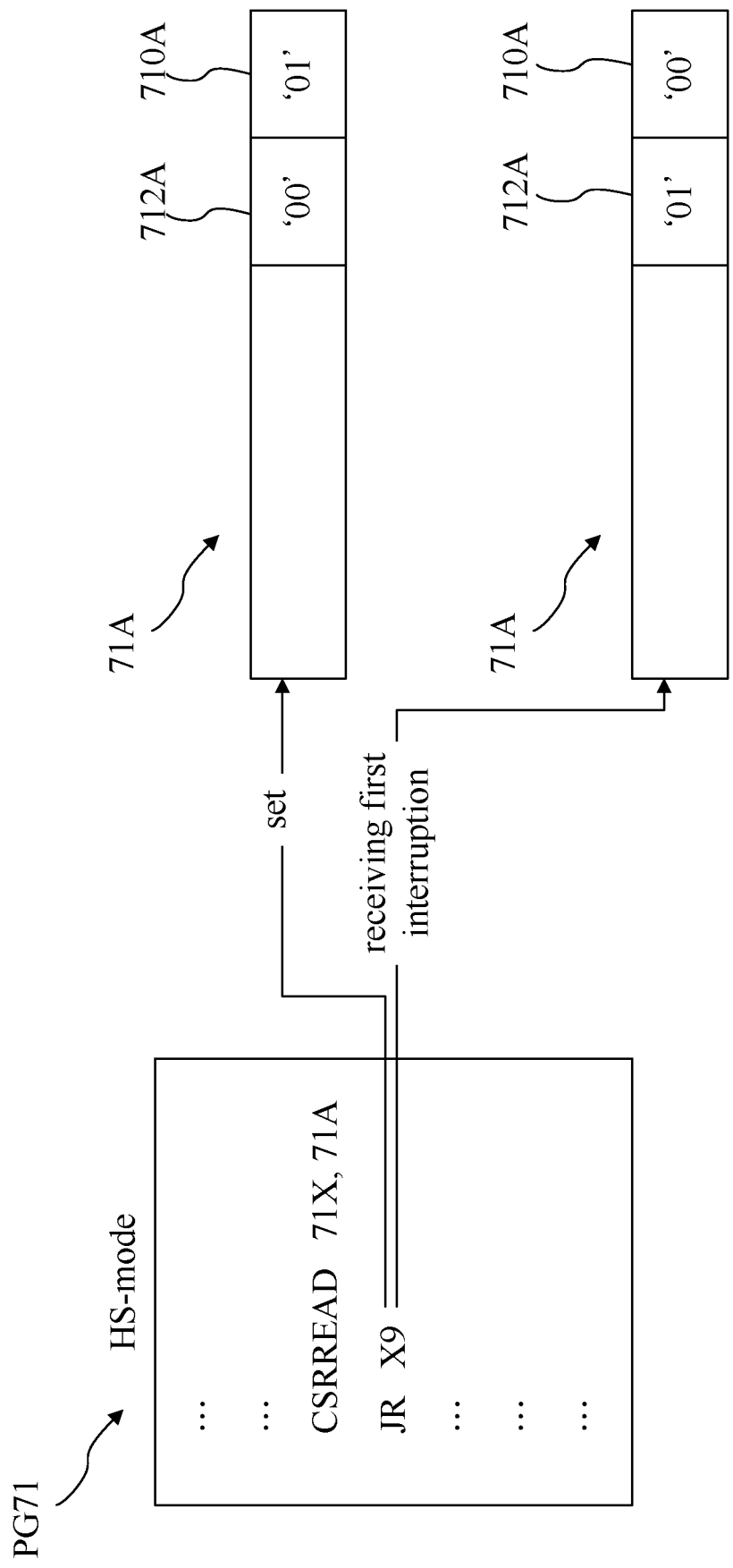
FIG. 8A to FIG. 8C are schematic views of an example of JOP attack detection.
Figure 8B:
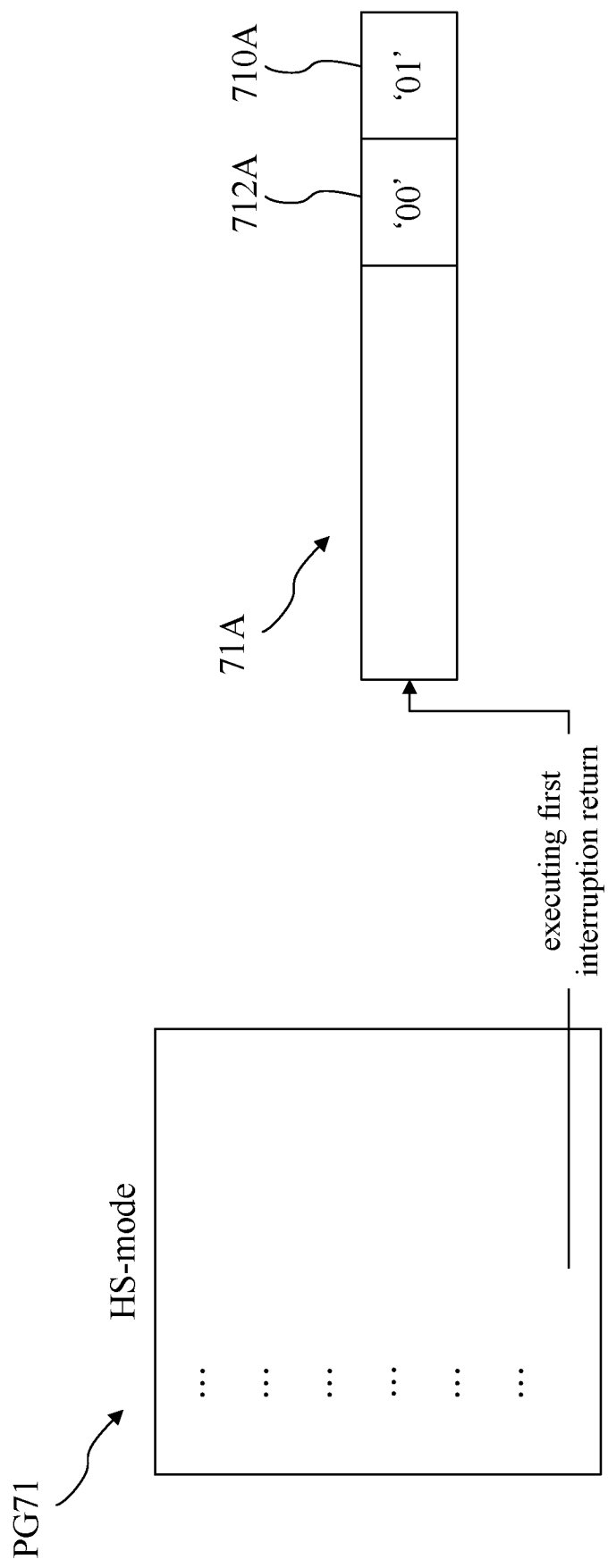
Figure 8C:
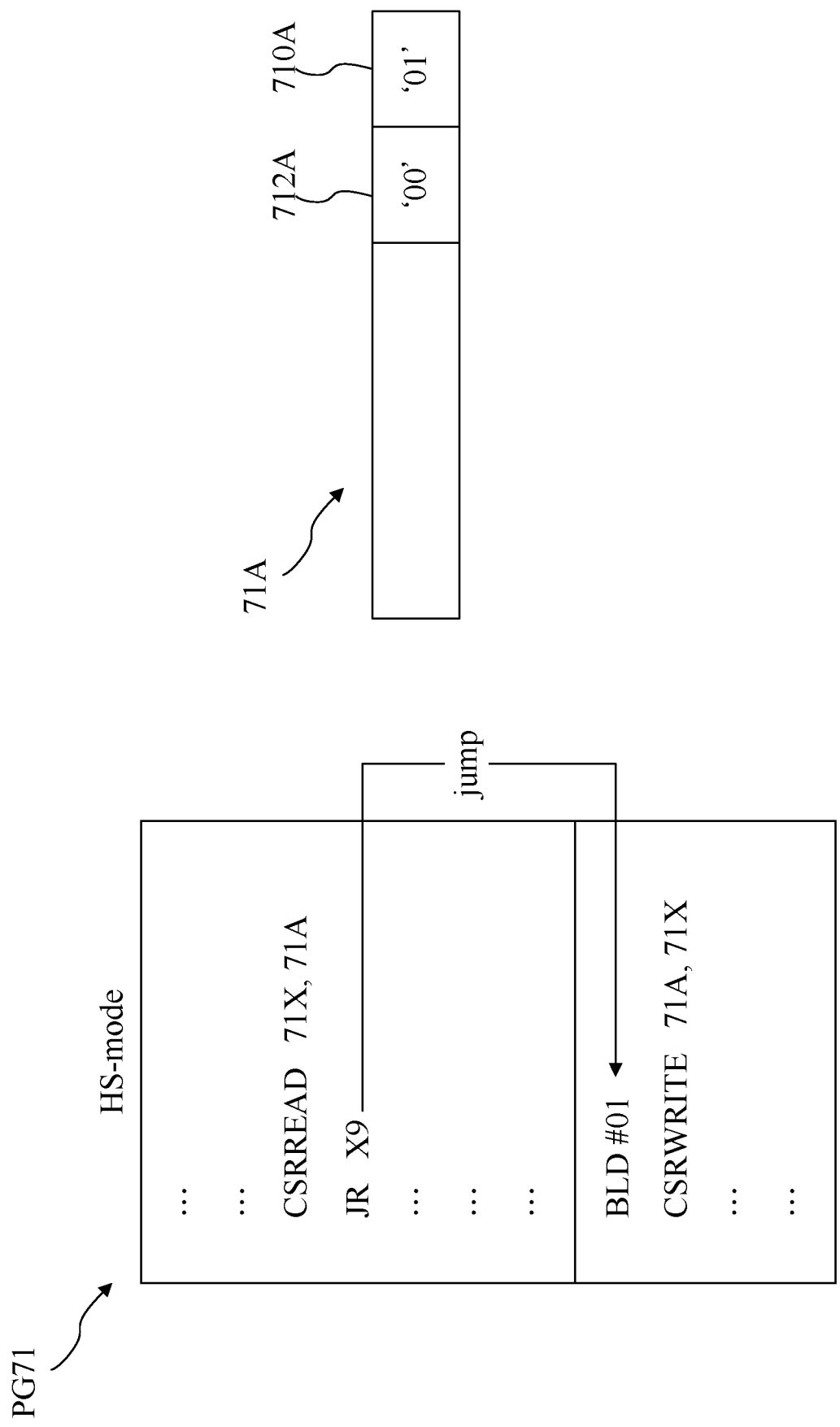

FIG. 8A through FIG. 8C are schematic views of an example of JOP attack detection of the application. The example is about operation in RISC-V framework, and the jump-related instructions include existing jump instruction JR and jump and link instruction JALR in RISC-V framework. JR-related jump state parameter is a first value (for example, '01'). JALR-related jump state parameter is a second value (for example, '10'). Other instructions-related jump state parameter is a third value (for example, '00'). Moreover, in the example, the legal instruction is BLD of the framework of the application, and the parameter of legal instruction BLD is #IMM (instruction BLD is executed by, for example, BLD #IMM). In some embodiments, the legal instruction BLD is implemented by existing addition instruction ADDI (for example, ADDI X0, X0, #IMM) in RISC-V framework. However, the example is not restrictive of implementation of the application.

Referring to FIG. 8A, the execution unit 73 loads and executes program PG71, and prepares for execution of jump instruction JR in program PG71 in the HS-mode. Before executing jump instruction JR, the execution unit 73 executes instruction CSRREAD to store all the values of the register 71A to the register 71X. The execution unit 73 sets the field 710A of the register 71A to the first jump state parameter according to the execution of jump instruction JR. The first jump state parameter has a value of '01'.

Then, the execution unit 73 receives the first interruption in the first privilege level mode and enters (i.e., is trapped to) the same privilege level mode (i.e., the first privilege level mode) according to the first interruption. To prevent the execution carried out after the first interruption from affecting jump state recordation, the execution unit 73 stores the value of the field 710A of the register 71A to the field 712A of the register 71A according to the first interruption and sets the value of the field 710A of the register 71A to '00'.

Referring to FIG. 8B, in the course of execution of the program, the execution unit 73 executes the first interruption return. The execution unit 73 returns to the first privilege level mode according to the execution of the first interruption return, stores the value of the field 712A of the register 71A to the field 710A of the register 71A, and sets the value of the field 712A of the register 71A to '00'.

Referring to FIG. 8C, the execution unit 73 jumps to the corresponding instruction of specified register X9 of jump instruction JR. The execution unit 73 determines whether the corresponding instruction is a legal instruction and whether the parameter of the corresponding instruction is equal to the first jump state parameter of the field 710A of the register 71A. In this example, the execution unit 73 determines that the corresponding instruction is legal instruction BLD, and further determines that the parameter of BLD is equal to the first jump state parameter of the field 710A of the register 71A. Therefore, the execution unit 73 continues to execute the program and executes instruction CSRWRITE to store all the values of the register 71X to the register 71A.

Figure 9:
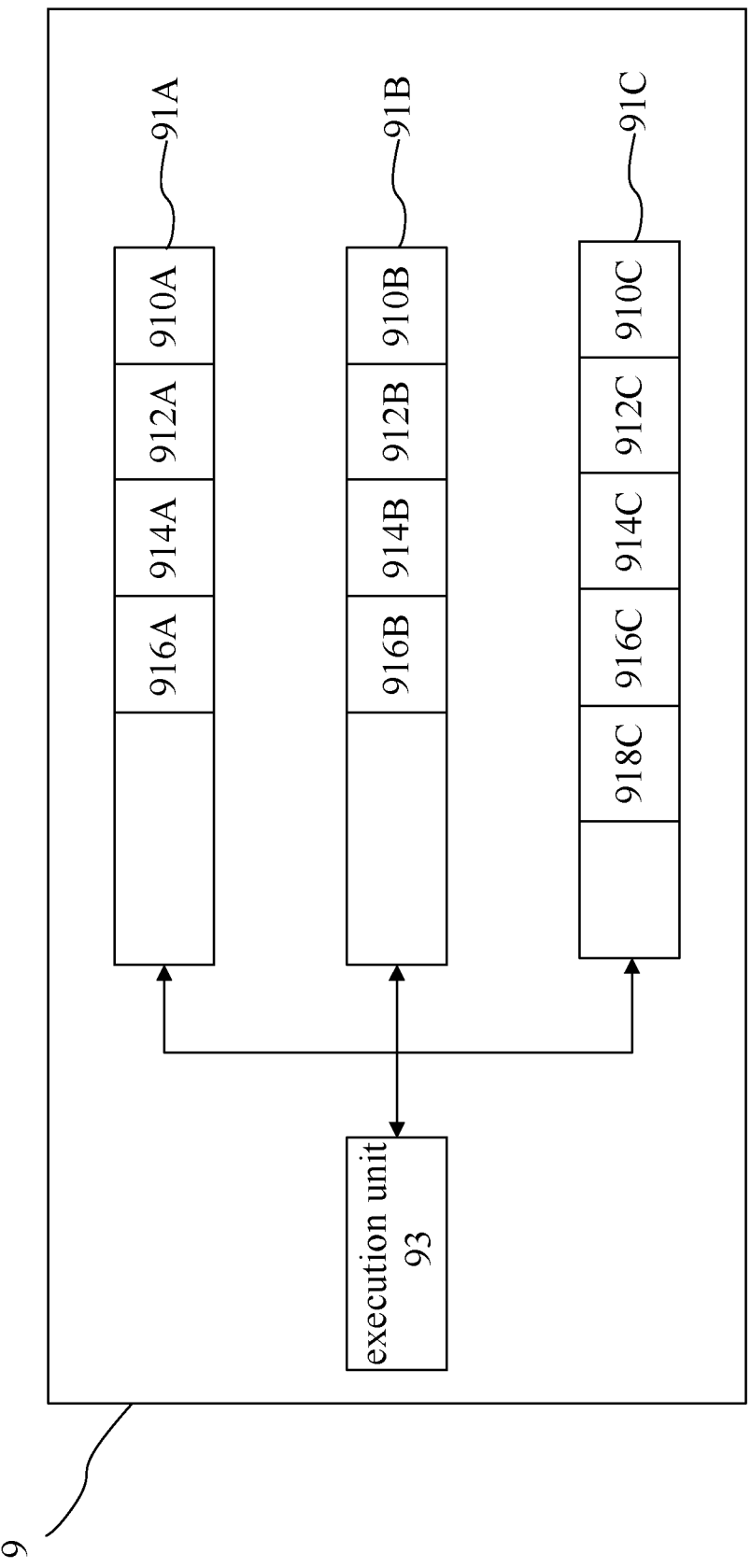
FIG. 9 is a block diagram of a processor according to an embodiment of the application.

FIG. 9 is a block diagram of a processor 9 according to an embodiment of the application. The processor 9 comprises registers 91A, 91B, 91C and an execution unit 93. The execution unit 93 is coupled to and/or electrically connected to the registers 91A, 91B, 91C. In this embodiment, the register 91A is for use in the first privilege level mode (for example, VS-mode), the register 91B is for use in the second privilege level mode (for example, HS-mode), and the register 91C is for use in the third privilege level mode (for example, M-mode).

The register 91A records different instruction jump states, including fields 910A, 912A, 914A and 916A, in the first privilege level mode. The field 910A records the execution state of the jump-related instructions executed in the first privilege level mode. The field 912A records the execution state of the jump-related instructions executed in the preceding privilege level mode. The field 914A is a first enabled state field for recording a detection enabled state of the first privilege level mode (i.e., whether to enable the attack detection function in the first privilege level mode according to the application). The field 916A is a second enabled state field for recording a detection enabled state of the second privilege level mode (i.e., whether to enable the attack detection function in the second privilege level mode according to the application).

The register 91B records different instruction jump states, including fields 910B, 912B, 914B and 916B, in the second privilege level mode. The field 910B records the execution state of the jump-related instructions executed in the second privilege level mode. The field 912A records the execution state of the jump-related instructions executed in the preceding privilege level mode. The field 914A is a first enabled state field for recording a detection enabled state of the first privilege level mode (i.e., whether to enable the attack detection function in the first privilege level mode according to the application). The field 916B is a second enabled state field for recording a detection enabled state of the second privilege level mode (i.e., whether to enable the attack detection function in the second privilege level mode according to the application).

The register 91C records different instruction jump states, including fields 910C, 912C, 914C, 916C and 918C, in the third privilege level mode. The field 910C records the execution state of the jump-related instructions executed in the third privilege level mode. The field 912C records the execution state of the jump-related instructions executed in the preceding privilege level mode. The field 914C is a first enabled state field for recording a detection enabled state of the first privilege level mode (i.e., whether to enable the attack detection function in the first privilege level mode according to the application). The field 916C is a second enabled state field for recording a detection enabled state of the second privilege level mode (i.e., whether to enable the attack detection function in the second privilege level mode according to the application). The field 918C is a third enabled state field for recording a detection enabled state of the third privilege level mode (i.e., whether to enable the attack detection function in the third privilege level mode according to the application).

The processor 9 performs the same function as the processors 1, 3, 5, 7 and is, for the sake of brevity, not reiterated herein.

Figure 10:
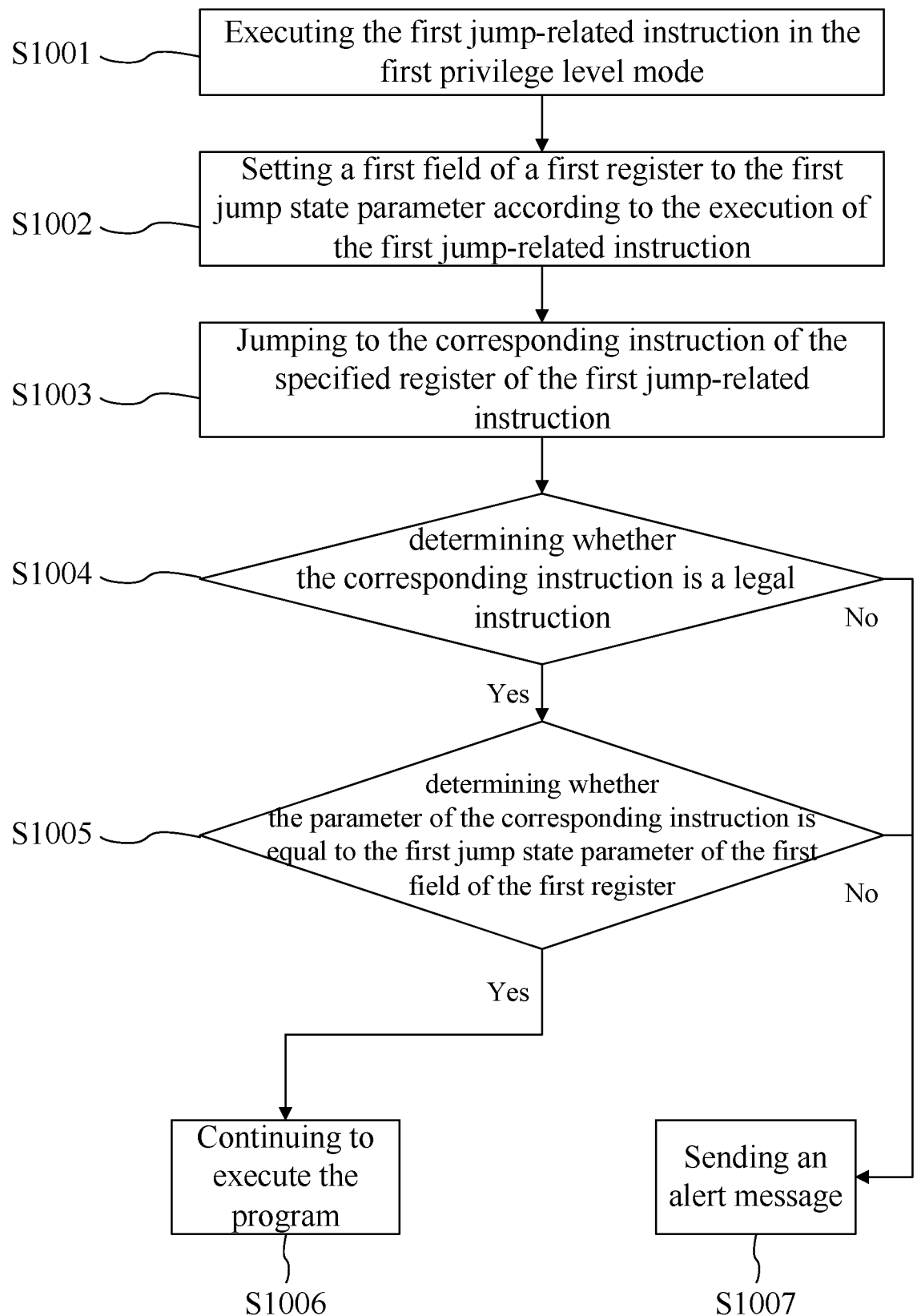
FIG. 10 is a flowchart of an attack detection method according to an embodiment of the application.

Some embodiments of the application provide an attack detection method for use with a processor, and a flowchart of the attack detection method is shown in FIG. 10. A data operation method of the embodiments is implemented with a processor (for example, the processor of the aforesaid embodiments), and the steps of the method are described below. Step S1001 is performed to execute the first jump-related instruction in the first privilege level mode. Step S1002 is performed to set a first field of a first register to the first jump state parameter according to the execution of the first jump-related instruction. The first register is for use in the first privilege level mode. The first field of the first register records the execution state of the first jump-related instruction.

Step S1003 is performed to jump to the corresponding instruction of the specified register of the first jump-related instruction. Step S1004 is performed to determine whether the corresponding instruction is a legal instruction. When it is determined in step S1004 that the corresponding instruction is not the legal instruction, step S1007 is performed to send an alert message. When it is determined in step S1004 that the corresponding instruction is the legal instruction, step S1005 is performed to determine whether the parameter of the corresponding instruction is equal to the first jump state parameter of the first field of the first register.

When it is determined in step S1005 that the parameter of the corresponding instruction is not equal to the first jump state parameter of the first field of the first register, step S1007 is performed to send an alert message. When it is determined in step S1005 that the parameter of the corresponding instruction is equal to the first jump state parameter of the first field of the first register, step S1006 is performed to continue to execute the program.

Figure 11A:
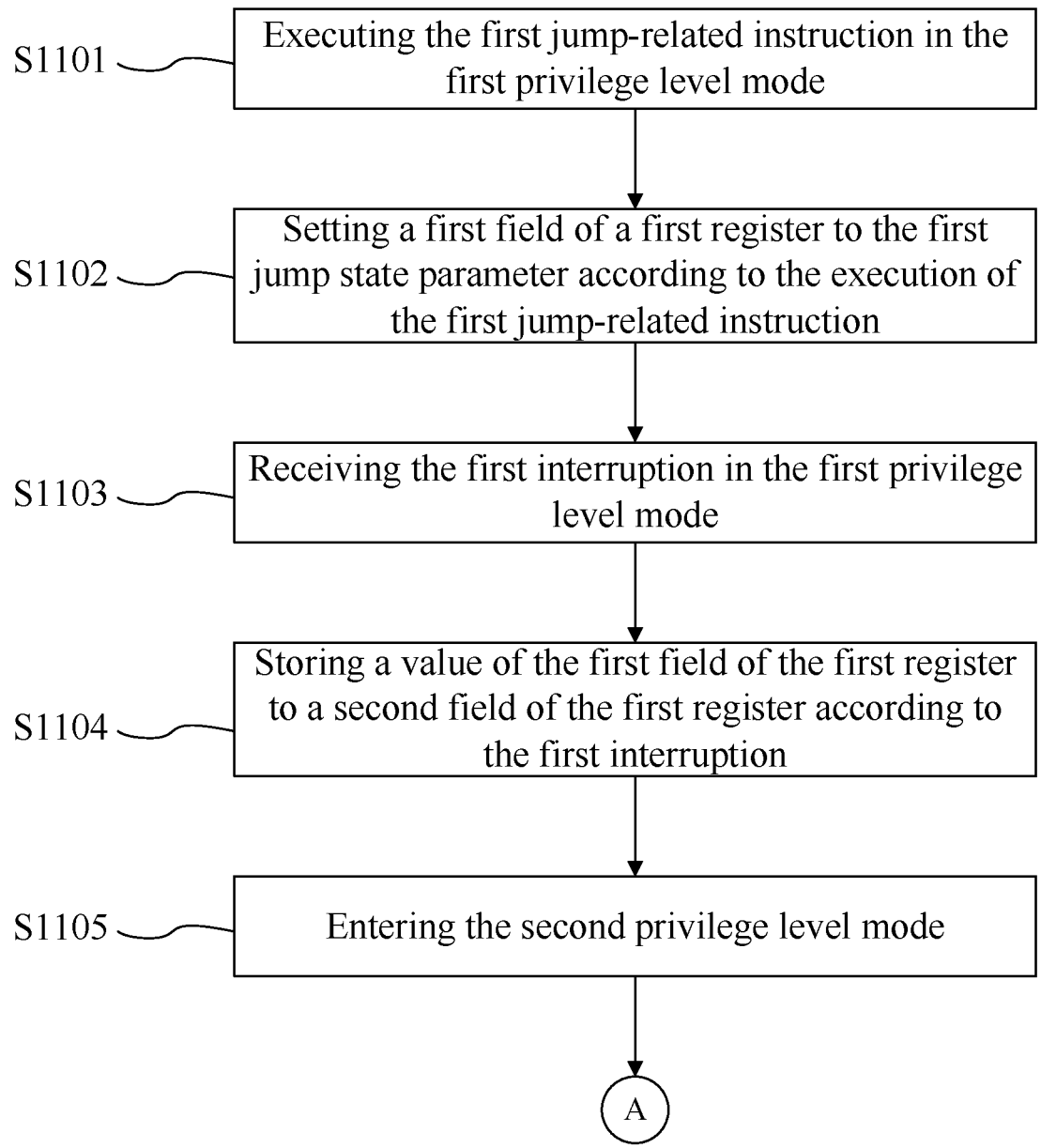
FIG. 11A to FIG. 11C are flowcharts of the attack detection method according to an embodiment of the application.
Figure 11B:
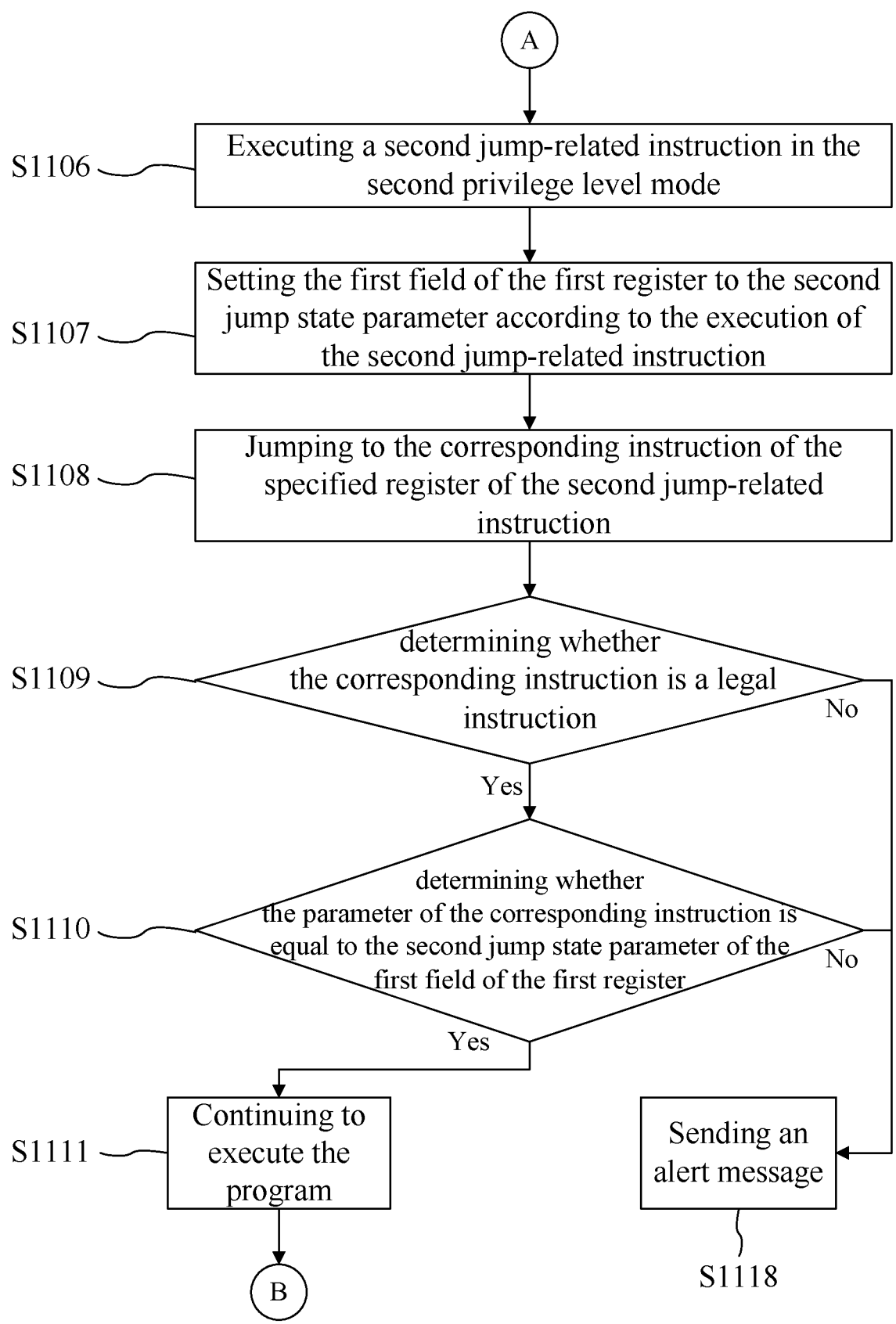
Figure 11C:
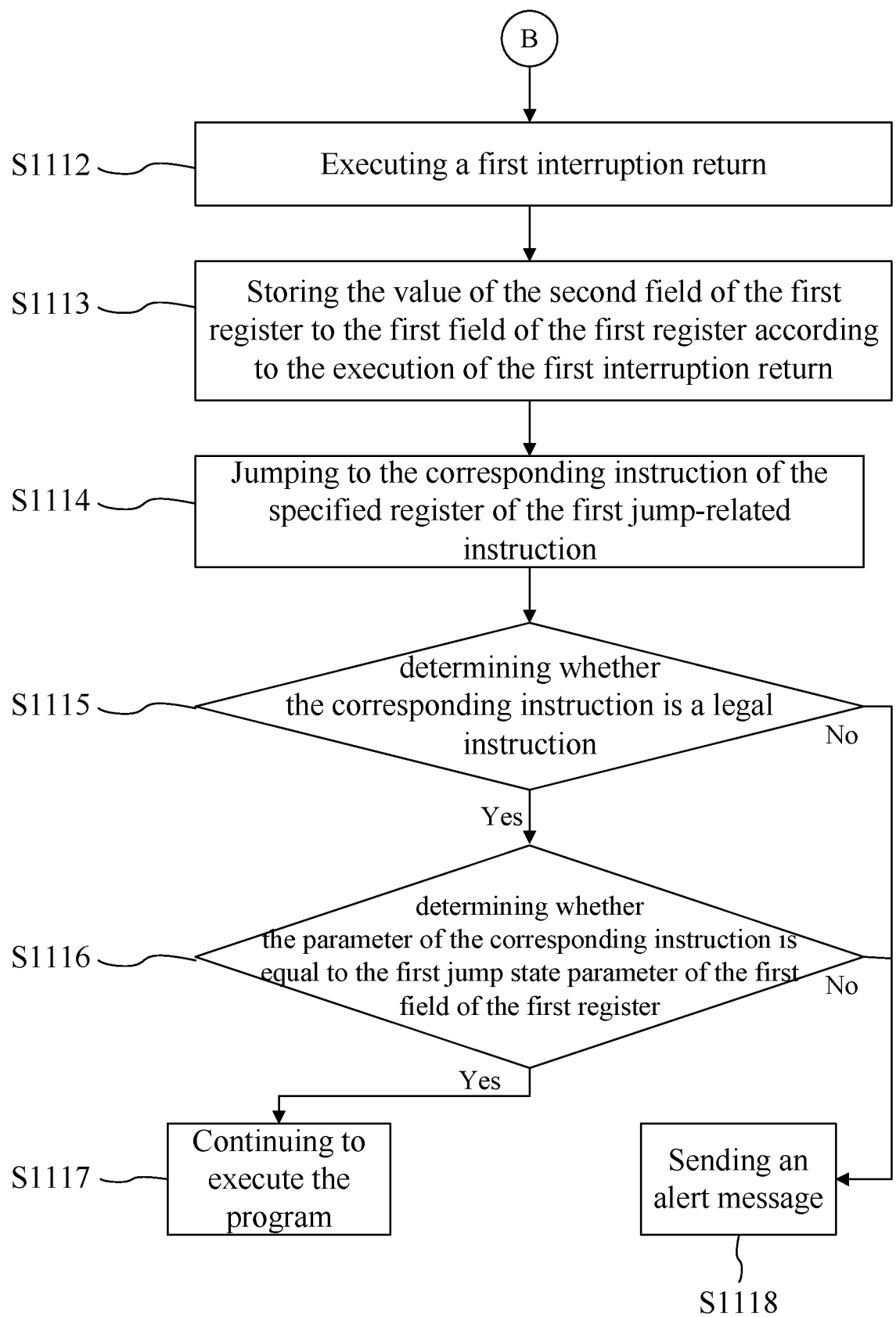

Some embodiments of the application provide an attack detection method for use with a processor, and flowcharts of the attack detection method are shown in FIGS. 11A to 11C. A data operation method of the embodiments is implemented with a processor (for example, the processor of the aforesaid embodiments), and the steps of the method are described below. First, step S1101 is performed to execute the first jump-related instruction in the first privilege level mode. Step S1102 is performed to set a first field of a first register to the first jump state parameter according to the execution of the first jump-related instruction. The first register is for use in the first privilege level mode. The first field of the first register records the execution state of the first jump-related instruction.

Step S1103 is performed to receive the first interruption in the first privilege level mode. Step S1104 is performed to store a value of the first field of the first register to a second field of the first register according to the first interruption. Step S1105 is performed to enter the second privilege level mode. Step S1106 is performed to execute a second jump-related instruction in the second privilege level mode. Step S1107 is performed to set the first field of the first register to the second jump state parameter according to the execution of the second jump-related instruction. The first register is for use in the second privilege level mode.

Step S1108 is performed to jump to the corresponding instruction of the specified register of the second jump-related instruction. Step S1109 is performed to determine whether the corresponding instruction is a legal instruction. When it is determined in step S1109 that the corresponding instruction is not the legal instruction, step S1118 is performed to send an alert message. When it is determined in step S1109 that the corresponding instruction is the legal instruction, step S1110 is performed to determine whether the parameter of the corresponding instruction is equal to the second jump state parameter of the first field of the first register.

When it is determined in step S1110 that the parameter of the corresponding instruction is not equal to the second jump state parameter of the first field of the first register, step S1118 is performed to send an alert message. When it is determined in step S1110 that the parameter of the corresponding instruction is equal to the second jump state parameter of the first field of the first register, step S1111 is performed to continue to execute the program.

Step S1112 is performed to execute the first interruption return. Step S1113 is performed to store the value of the second field of the first register to the first field of the first register according to the execution of the first interruption return. Step S1114 is performed to jump to the corresponding instruction of the specified register of the first jump-related instruction. Step S1115 is performed to determine whether the corresponding instruction is a legal instruction. When it is determined in step S1115 that the corresponding instruction is not the legal instruction, step S1118 is performed to send an alert message. When it is determined in step S1115 that the corresponding instruction is the legal instruction, step S1116 is performed to determine whether the parameter of the corresponding instruction is equal to the first jump state parameter of the first field of the first register.

When it is determined in step S1116 that the parameter of the corresponding instruction is not equal to the first jump state parameter of the first field of the first register, step S1118 is performed to send an alert message. When it is determined in step S1116 that the parameter of the corresponding instruction is equal to the first jump state parameter of the first field of the first register, step S1117 is performed to continue to execute the program.

Figure 12A:
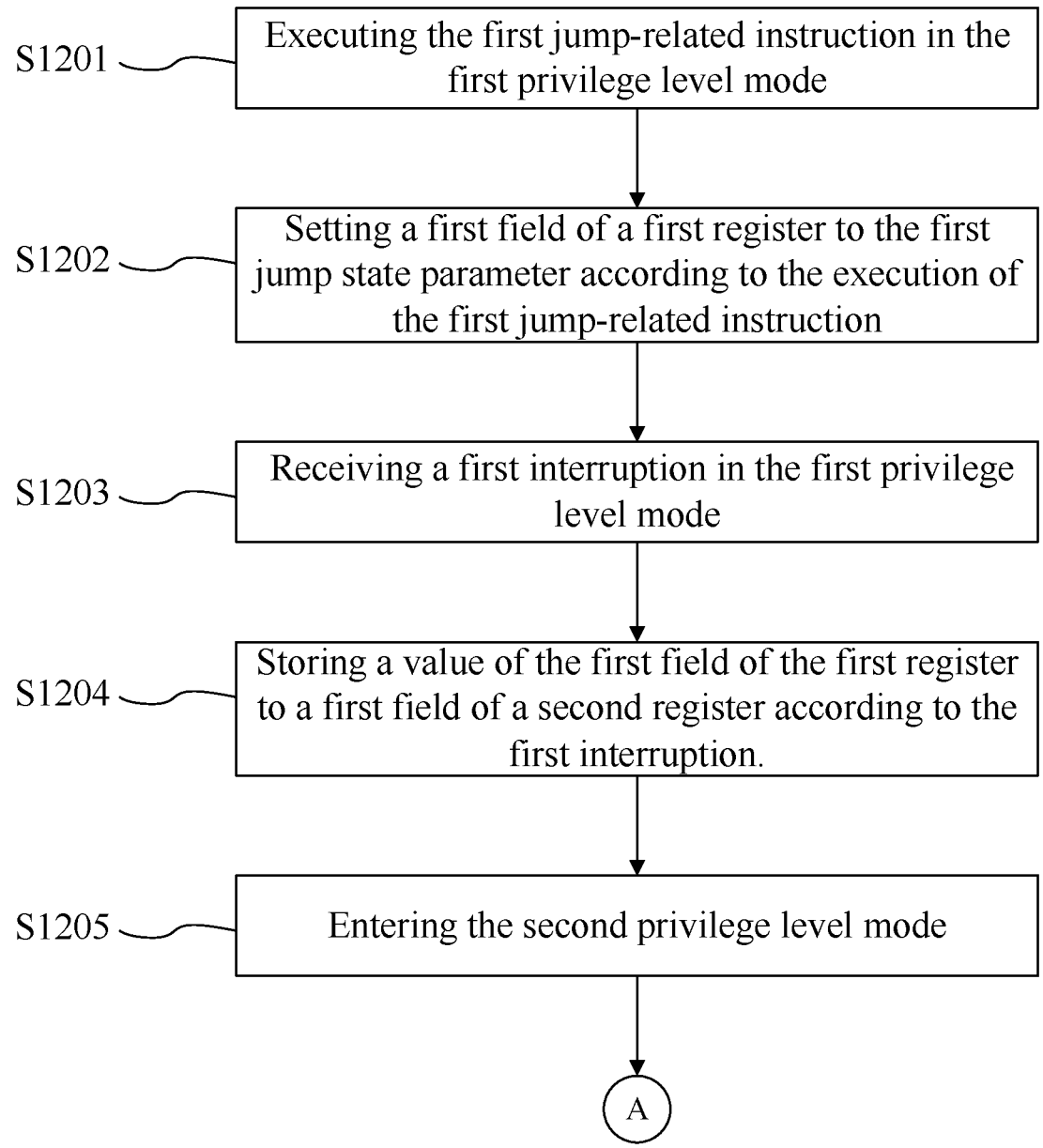
FIG. 12A to FIG. 12C are flowcharts of the attack detection method according to an embodiment of the application.
Figure 12B:
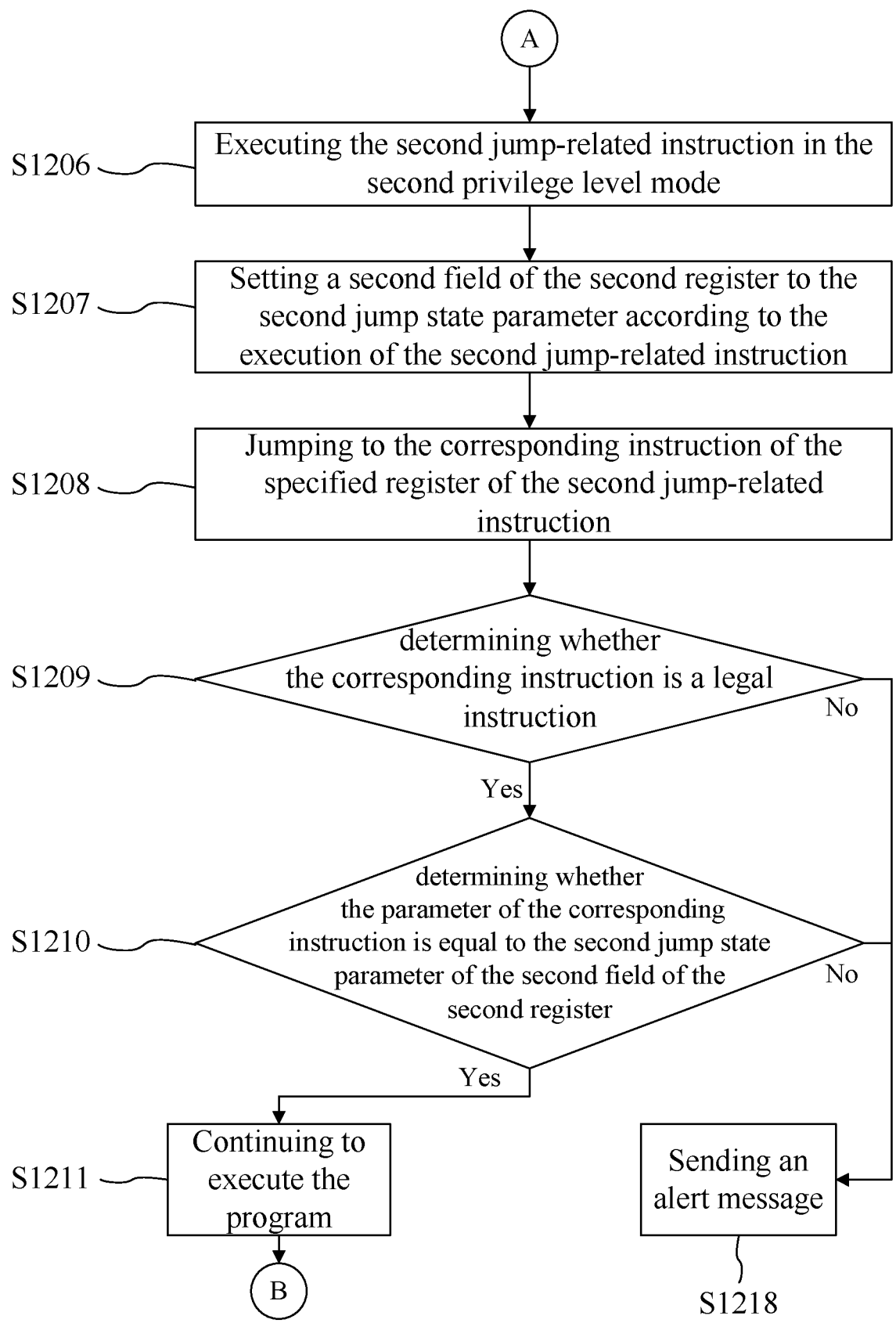
Figure 12C:
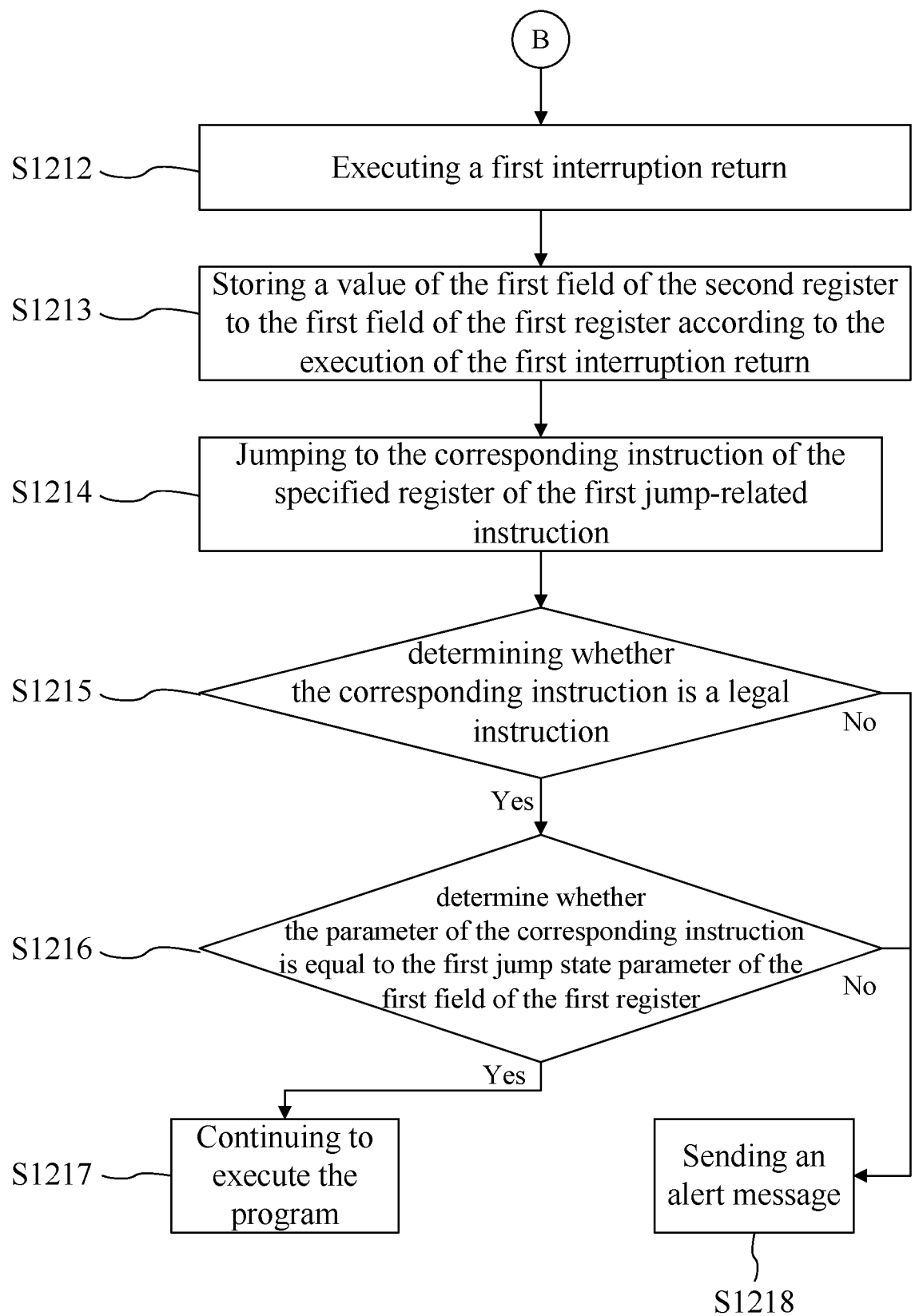

Some embodiments of the application provide an attack detection method for use with a processor, and flowcharts of the attack detection method are shown in FIGS. 12A to 12C. A data operation method of the embodiments is implemented with a processor (for example, the processor of the aforesaid embodiments), and the steps of the method are described below. First, step S1201 is performed to execute the first jump-related instruction in the first privilege level mode. Step S1202 is performed to set a first field of a first register to the first jump state parameter according to the execution of the first jump-related instruction. The first register is for use in the first privilege level mode. The first field of the first register records the execution state of the first jump-related instruction.

Step S1203 is performed to receive the first interruption in the first privilege level mode. Step S1204 is performed to store a value of the first field of the first register to a first field of a second register according to the first interruption. The second register is for use in the second privilege level mode. Step S1205 is performed to enter the second privilege level mode. Step S1206 is performed to execute the second jump-related instruction in the second privilege level mode. Step S1207 is performed to set a second field of the second register to the second jump state parameter according to the execution of the second jump-related instruction.

Step S1208 is performed to jump to the corresponding instruction of the specified register of the second jump-related instruction. Step S1209 is performed to determine whether the corresponding instruction is a legal instruction. When it is determined in step S1209 that the corresponding instruction is not the legal instruction, step S1218 is performed to send an alert message. When it is determined in step S1209 that the corresponding instruction is the legal instruction, step S1210 is performed to determine whether the parameter of the corresponding instruction is equal to the second jump state parameter of the second field of the second register.

When it is determined in step S1210 that the parameter of the corresponding instruction is not equal to the second jump state parameter of the second field of the second register, step S1218 is performed to send an alert message. When it is determined in step S1210 that the parameter of the corresponding instruction is equal to the second jump state parameter of the second field of the second register, step S1211 is performed to continue to execute the program.

Step S1212 is performed to execute the first interruption return. Step S1213 is performed to store a value of the first field of the second register to the first field of the first register according to the execution of the first interruption return. Step S1214 is performed to jump to the corresponding instruction of the specified register of the first jump-related instruction. Step S1215 is performed to determine whether the corresponding instruction is a legal instruction. When it is determined in step S1215 that the corresponding instruction is not the legal instruction, step S1218 is performed to send an alert message. When it is determined in step S1215 that the corresponding instruction is the legal instruction, step S1216 is performed to determine whether the parameter of the corresponding instruction is equal to the first jump state parameter of the first field of the first register.

When it is determined in step S1216 that the parameter of the corresponding instruction is not equal to the first jump state parameter of the first field of the first register, step S1218 is performed to send an alert message. When it is determined in step S1216 that the parameter of the corresponding instruction is equal to the first jump state parameter of the first field of the first register, step S1217 is performed to continue to execute the program.

Figure 13A:
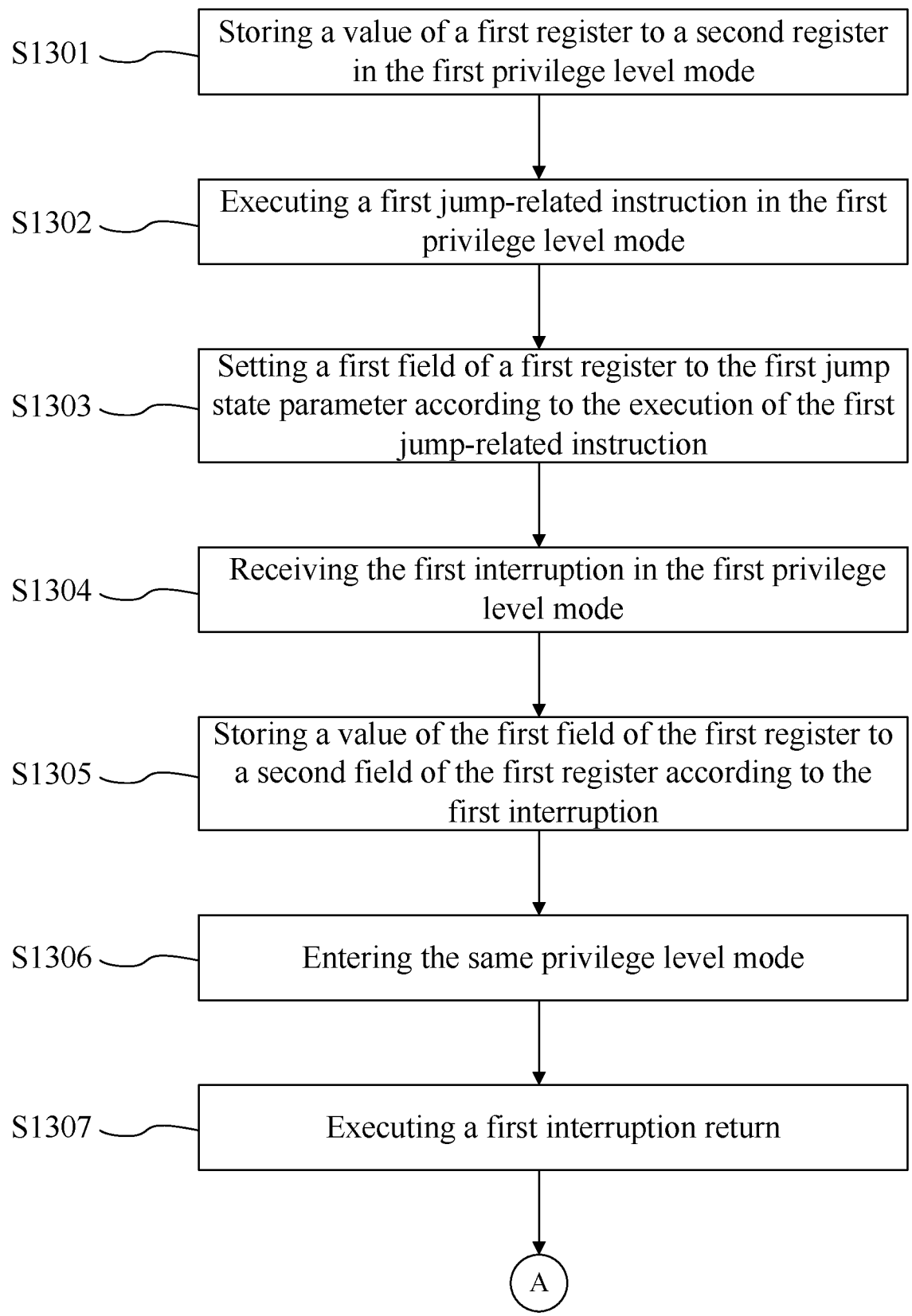
FIG. 13A to FIG. 13B are flowcharts of the attack detection method according to an embodiment of the application.
Figure 13B:
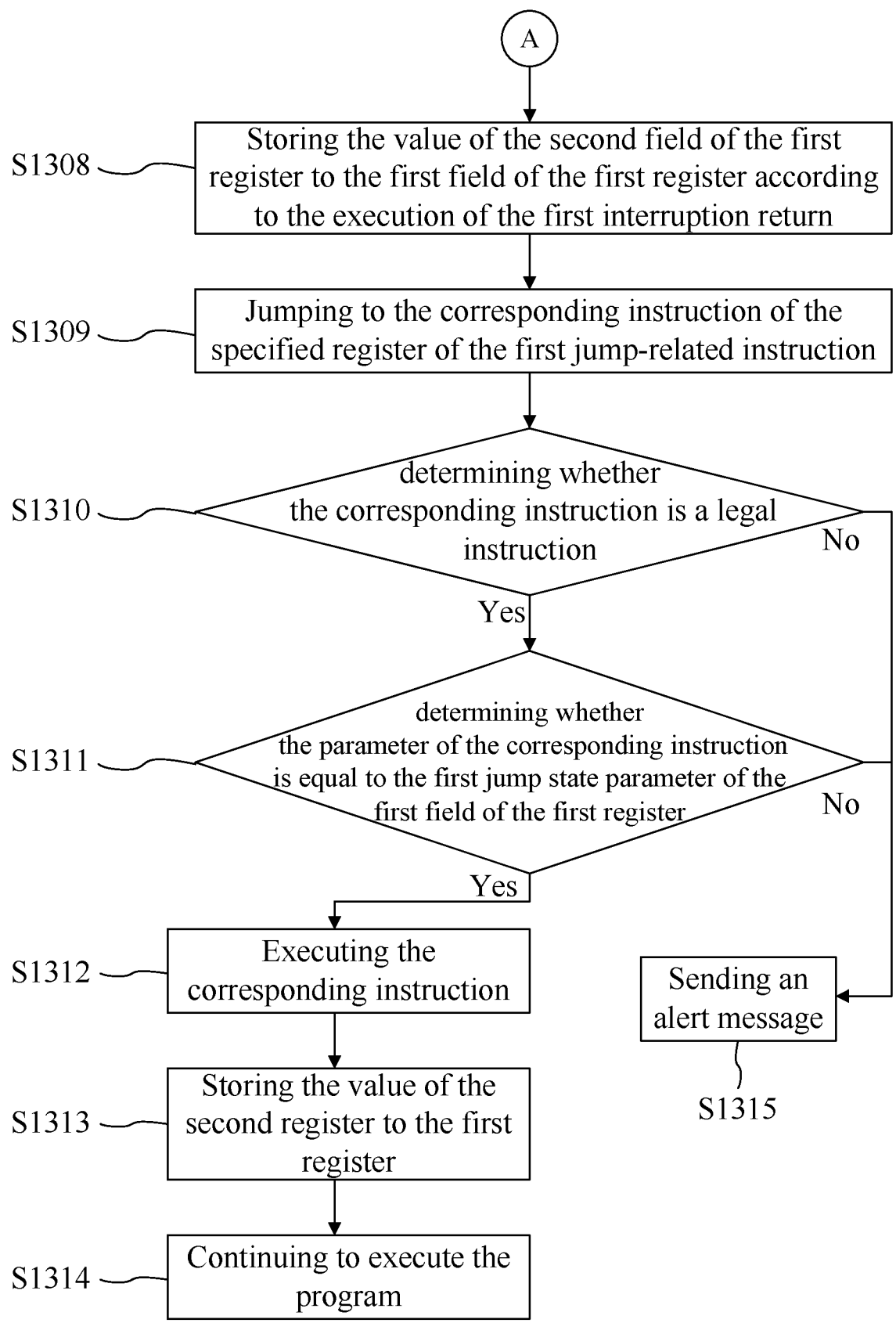

Some embodiments of the application provide an attack detection method for use with a processor, and flowcharts of the attack detection method are shown in FIGS. 13A and 13B. A data operation method of the embodiments is implemented with a processor (for example, the processor of the aforesaid embodiments), and the steps of the method are described below. First, step S1301 is performed to store a value of a first register to a second register in the first privilege level mode. Step S1302 is performed to execute a first jump-related instruction in the first privilege level mode. Step S1303 is performed to set a first field of a first register to the first jump state parameter according to the execution of the first jump-related instruction. The first register is for use in the first privilege level mode. The first field of the first register records the execution state of the first jump-related instruction.

Step S1304 is performed to receive the first interruption in the first privilege level mode. Step S1305 is performed to store a value of the first field of the first register to a second field of the first register according to the first interruption. Step S1306 is performed to enter the same privilege level mode (i.e., the first privilege level mode). Step S1307 is performed to execute the first interruption return. Step S1308 is executed to store the value of the second field of the first register to the first field of the first register according to the execution of the first interruption return. Step S1309 is performed to jump to the corresponding instruction of the specified register of the first jump-related instruction. Step S1310 is performed to determine whether the corresponding instruction is a legal instruction. When it is determined in step S1310 that the corresponding instruction is not the legal instruction, step S1315 is performed to send an alert message. When it is determined in step S1310 that the corresponding instruction is the legal instruction, step S1311 is performed to determine whether the parameter of the corresponding instruction is equal to the first jump state parameter of the first field of the first register.

When it is determined in step S1311 that the parameter of the corresponding instruction is not equal to the first jump state parameter of the first field of the first register, step S1315 is performed to send an alert message. When it is determined in step S1311 that the parameter of the corresponding instruction is equal to the first jump state parameter of the first field of the first register, step S1312 is performed to execute the corresponding instruction. Step S1313 is performed to store a value of the second register to the first register. Step S1314 is performed to continue to execute the program.

The processor and the attack detection method of the present application are effective in detecting, through a framework of legal instructions, whether corresponding instructions generated as a result of execution of jump-related instructions are legal and further determining, according to the detection result, whether JOP attacks are likely to occur and accordingly determining whether to report related exception troubleshooting.

The features of some embodiments of the present application are described in brief for a person skilled in the art to more comprehensively understand various aspects of the disclosure of the present application. On the basis of the disclosure of the present application, it would be easy for a person skilled in the art pertinent to the technical field of the present application to design or modify other processes and structures, so as to achieve the same objectives and/or the same advantages of the embodiments described herein. A person skilled in the art pertinent to the technical field of the present application would be able to understand that these equivalent implementation forms are encompassed within the spirit and scope of the disclosure of the present application, and various changes, substitution, replacements and alterations may be made without departing from the spirit and range of the disclosure of the present application.

What is claimed is:

1. An attack detection method for a processor, comprising:
   executing, by an execution unit of the processor, a first jump-related instruction in a first privilege level mode;
   setting, by the execution unit, a first field of a first register of the processor to a first jump state parameter according to execution of the first jump-related instruction, wherein the first register is for the first privilege level mode, and the first field of the first register records an execution state of the first jump-related instruction;

jumping, by the execution unit, to a first corresponding instruction of a specified register of the first jump-related instruction;

determining, by the execution unit, whether the first corresponding instruction is a legal instruction and whether a first parameter of the first corresponding instruction is equal to the first jump state parameter of the first field of the first register to obtain a first determination result; and determining, by the execution unit according to the first determination result, whether to send an alert message.

2. The attack detection method of claim 1, further comprising:

determining, by the execution unit, to send the alert message when the first determination result is determining that the first corresponding instruction is not the legal instruction or that the first parameter of the first corresponding instruction is not equal to the first jump state parameter of the first field of the first register; and determining, by the execution unit, not to send the alert message when the first determination result is determining that the first corresponding instruction is the legal instruction and that the first parameter of the first corresponding instruction is equal to the first jump state parameter of the first field of the first register.

3. The attack detection method of claim 1, further comprising:

receiving, by the execution unit, a first interruption in the first privilege level mode;

storing, by the execution unit, a value of the first field of the first register to a second field of the first register according to the first interruption;

executing, by the execution unit, a first interruption return; and storing, by the execution unit, a value of the second field of the first register to the first field of the first register according to execution of the first interruption return.

4. The attack detection method of claim 3, further comprising the steps of:

entering, by the execution unit, a second privilege level mode after receiving the first interruption;

executing, by the execution unit, a second jump-related instruction in the second privilege level mode;

setting, by the execution unit, the first field of the first register to a second jump state parameter according to execution of the second jump-related instruction, wherein the first register is for the second privilege level mode;

jumping, by the execution unit, to a second corresponding instruction of a specified register of the second jump-related instruction;

determining, by the execution unit, whether the second corresponding instruction is the legal instruction and whether a second parameter of the second corresponding instruction is equal to the second jump state parameter of the first field of the first register to obtain a second determination result; and determining, by the execution unit according to the second determination result, whether to send the alert message.

5. The attack detection method of claim 4, further comprising the steps of:

determining, by the execution unit, to send the alert message when the second determination result is determining that the second corresponding instruction is not the legal instruction or that the second parameter of the second corresponding instruction is not equal to the second jump state parameter of the first field of the first register; and determining, by the execution unit, not to send the alert message when the second determination result is determining that the second corresponding instruction is the legal instruction and that the second parameter of the second corresponding instruction is equal to the second jump state parameter of the first field of the first register.

6. The attack detection method of claim 3, further comprising:

storing, by the execution unit before executing the first jump-related instruction, a value of the first register to a second register of the processor.

7. The attack detection method of claim 6, further comprising:

storing, by the execution unit when the first corresponding instruction is determined as the legal instruction, a value of the second register to the first register after executing the first corresponding instruction.

8. The attack detection method of claim 1, further comprising the steps of:

receiving, by the execution unit, a first interruption in the first privilege level mode;

storing, by the execution unit, a value of the first field of the first register to a first field of a second register of the processor according to the first interruption;

executing, by the execution unit, a first interruption return; and storing, by the execution unit, a value of the first field of the second register to the first field of the first register according to execution of the first interruption return.

9. The attack detection method of claim 8, further comprising the steps of:

entering, by the execution unit, a second privilege level mode after receiving the first interruption;

executing, by the execution unit, a second jump-related instruction in the second privilege level mode;

setting, by the execution unit, a second field of the second register to a second jump state parameter according to execution of the second jump-related instruction, wherein the second register is for the second privilege level mode;

jumping, by the execution unit, to a second corresponding instruction of a specified register of the second jump-related instruction;

determining, by the execution unit, whether the second corresponding instruction is the legal instruction and whether a second parameter of the second corresponding instruction is equal to the second jump state parameter of the second field of the second register to obtain a second determination result; and determining, by the execution unit according to the second determination result, whether to send the alert message.

10. The attack detection method of claim 9, further comprising:

determining, by the execution unit, to send the alert message when the second determination result is determining that the second corresponding instruction is not the legal instruction or that a second parameter of the second corresponding instruction is not equal to the second jump state parameter of the second field of the second register; and determining, by the execution unit, not to send the alert message when the second determination result is determining that the second corresponding instruction is the legal instruction or that a second parameter of the second corresponding instruction is equal to the second jump state parameter of the second field of the second register.

11. A processor, comprising:
a first register for a first privilege level mode; and
an execution unit electrically connected to the first register and configured to:
  execute a first jump-related instruction in the first privilege level mode;
  set a first field of the first register to a first jump state parameter according to execution of the first jump-related instruction, wherein the first field records an execution state of the first jump-related instruction;
  jump to a first corresponding instruction of a specified register of the first jump-related instruction;
  determine whether the first corresponding instruction is a legal instruction and whether a first parameter of the first corresponding instruction is equal to the first jump state parameter of the first field of the first register to obtain a first determination result; and
  determine, according to the first determination result, whether to send an alert message.

12. The processor of claim 11, wherein the execution unit is further configured to:
  determine to send the alert message when the first determination result is determining that the first corresponding instruction is not the legal instruction or that the first parameter of the first corresponding instruction is not equal to the first jump state parameter of the first field of the first register; and
  determine not to send the alert message when the first determination result is determining that the first corresponding instruction is the legal instruction and that the first parameter of the first corresponding instruction is equal to the first jump state parameter of the first field of the first register.

13. The processor of claim 11, wherein the execution unit is further configured to:
  receive a first interruption in the first privilege level mode;
  store a value of the first field of the first register to a second field of the first register according to the first interruption;
  execute a first interruption return; and
  store a value of the second field of the first register to the first field of the first register according to execution of the first interruption return.

14. The processor of claim 13, wherein the execution unit is further configured to:
  enter a second privilege level mode after receiving the first interruption;
  execute a second jump-related instruction in the second privilege level mode;
  set the first field of the first register to a second jump state parameter according to execution of the second jump-related instruction, wherein the first register is for the second privilege level mode;
  jump to a second corresponding instruction of a specified register of the second jump-related instruction;
  determine whether the second corresponding instruction is the legal instruction and whether a second parameter of the second corresponding instruction is equal to the second jump state parameter of the first field of the first register to obtain a second determination result; and
  determine, according to the second determination result, whether to send the alert message.

15. The processor of claim 14, wherein the execution unit is further configured to:
  determine to send the alert message when the second determination result is determining that the second corresponding instruction is not the legal instruction or that the second parameter of the second corresponding instruction is not equal to the second jump state parameter of the first field of the first register; and
  determine not to send the alert message when the second determination result is determining that the second corresponding instruction is the legal instruction and that the second parameter of the second corresponding instruction is equal to the second jump state parameter of the first field of the first register.

16. The processor of claim 13, wherein the execution unit is further configured to:
  store a value of the first register to a second register before executing the first jump-related instruction; and
  store a value of the second register to the first register upon determination that the first corresponding instruction is the legal instruction and execution of the first corresponding instruction.

17. The processor of claim 11, wherein the execution unit is further configured to:
  receive a first interruption in the first privilege level mode;
  store a value of the first field of the first register to a first field of a second register according to the first interruption;
  execute a first interruption return; and
  store a value of the first field of the second register to the first field of the first register according to execution of the first interruption return.

18. The processor of claim 17, wherein the execution unit is further configured to:
  enter a second privilege level mode after receiving the first interruption;
  execute a second jump-related instruction in the second privilege level mode;
  set a second field of the second register to a second jump state parameter according to execution of the second jump-related instruction, wherein the second register is for the second privilege level mode;
  jump to a second corresponding instruction of a specified register of the second jump-related instruction;
  determine whether the second corresponding instruction is the legal instruction and whether a second parameter of the second corresponding instruction is equal to the second jump state parameter of the second field of the second register to obtain a second determination result; and
  determine, according to the second determination result, whether to send the alert message.

19. The processor of claim 18, wherein the execution unit is further configured to:
  determine to send the alert message when the second determination result is determining that the second corresponding instruction is not the legal instruction or that a second parameter of the second corresponding instruction is not equal to the second jump state parameter of the second field of the second register; and
  determine not to send the alert message when the second determination result is determining that the second corresponding instruction is the legal instruction or that the second parameter of the second corresponding instruction is equal to the second jump state parameter of the second field of the second register.

20. The processor of claim 11, wherein the first jump-related instruction is a jump instruction or a jump and link instruction, and the first jump state parameter is a first value when the first jump-related instruction is the jump instruction or a second value when the first jump-related instruction is the jump and link instruction, the first corresponding instruction corresponds to the jump instruction when the first parameter of the first corresponding instruction is equal to the first value, the first corresponding instruction corresponds to the jump and link instruction when the first parameter of the first corresponding instruction is equal to the second value, and the first corresponding instruction corresponds to the jump instruction or the jump and link instruction when the first parameter of the first corresponding instruction is equal to a third value.

* * * * *